(12) United States Patent
Ishino

(10) Patent No.: US 10,838,257 B2
(45) Date of Patent: Nov. 17, 2020

(54) ILLUMINATION DEVICE AND DISPLAY DEVICE

(71) Applicant: Saturn Licensing LLC, New York, NY (US)

(72) Inventor: Hirohisa Ishino, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/598,492

(22) Filed: Oct. 10, 2019

(65) Prior Publication Data

US 2020/0041100 A1 Feb. 6, 2020

Related U.S. Application Data

(63) Continuation of application No. 16/263,914, filed on Jan. 31, 2019, now Pat. No. 10,480,753, which is a
(Continued)

(30) Foreign Application Priority Data

Nov. 9, 2012 (JP) ................. 2012-247262

(51) Int. Cl.
*G02F 1/13357* (2006.01)
*F21V 8/00* (2006.01)
*F21Y 115/10* (2016.01)

(52) U.S. Cl.
CPC ..... *G02F 1/133617* (2013.01); *G02B 6/0023* (2013.01); *G02B 6/0026* (2013.01);
(Continued)

(58) Field of Classification Search
None
See application file for complete search history.

(56) References Cited

U.S. PATENT DOCUMENTS 8,075,148 B2 12/2011 Nada
8,902,379 B2 12/2014 Park
(Continued)

FOREIGN PATENT DOCUMENTS

CN 101451673 A 6/2009
JP 2008-235827 A 10/2008
(Continued)

OTHER PUBLICATIONS

International Search Report from International Publication PCT/JP2013/077449 dated Jan. 14, 2014.
(Continued)

*Primary Examiner* — Phu Vu
(74) *Attorney, Agent, or Firm* — Lerner, David, Littenberg, Krumholz & Mentlik, LLP

(57) ABSTRACT

Provided is an illumination device that makes it possible to enhance utilization efficiency of light, and a display device that includes the illumination device. The illumination device includes: a light source that is configured to generate light of a first wavelength; a luminescent body that is configured to wavelength-convert the light of the first wavelength to light of a second wavelength, the second wavelength being different from the first wavelength; and a wavelength selective filter that is provided on a light-incident side of the luminescent body, the wavelength selective filter being configured to transmit the light of the first wavelength and to reflect the light of the second wavelength.

20 Claims, 21 Drawing Sheets

Related U.S. Application Data continuation of application No. 15/850,489, filed on Dec. 21, 2017, now Pat. No. 10,240,750, which is a continuation of application No. 15/484,541, filed on Apr. 11, 2017, now Pat. No. 9,885,462, which is a continuation of application No. 14/439,873, filed as application No. PCT/JP2013/077449 on Oct. 9, 2013, now Pat. No. 9,657,920.

(52) U.S. Cl.
CPC ..... *G02F 1/133615* (2013.01); *F21Y 2115/10* (2016.08); *G02F 2001/133614* (2013.01)

(56) References Cited

U.S. PATENT DOCUMENTS

| | | | |
|---|---|---|---|
| 9,885,462 B2 | 2/2018 | Ishino | |
| 10,480,753 B2 * | 11/2019 | Ishino | G02B 6/0026 |
| 2009/0147497 A1 | 6/2009 | Nada | |
| 2011/0204405 A1 | 8/2011 | Tsutsumi et al. | |
| 2012/0019740 A1 | 1/2012 | Kadowaki et al. | |
| 2012/0050649 A1 | 3/2012 | Yeo | |
| 2012/0113354 A1 | 5/2012 | Park | |
| 2013/0271700 A1 | 10/2013 | Nakamura et al. | |
| 2014/0021503 A1 | 1/2014 | Yoshida et al. | |
| 2014/0168572 A1 | 6/2014 | Iwata et al. | |

FOREIGN PATENT DOCUMENTS

| | | |
|---|---|---|
| JP | 2008-305936 A | 12/2008 |
| JP | 2009-071005 A | 4/2009 |
| JP | 2009-140822 A | 6/2009 |
| JP | 201097908 A | 4/2010 |
| JP | 2010-157468 A | 7/2010 |
| JP | 2012186436 A | 9/2012 |
| WO | 2010/044239 A1 | 4/2010 |
| WO | 2012053386 A1 | 4/2012 |
| WO | 2012132232 A1 | 10/2012 |

OTHER PUBLICATIONS

Chinese Office Action for Application No. 201380057197.6 dated May 3, 2016.
Ohinese Office Action for Application No. 201380057197.6 dated Jan. 5, 2017.
Lin Qiang et al., Modern Optical Fundamentals and Frontiers, Science Press, pp. 391-392, (2010) (a concise explanation of the relevance is found in the Chinese Office Action dated Jan. 5, 2017).

* cited by examiner

[ FIG. 1 ]
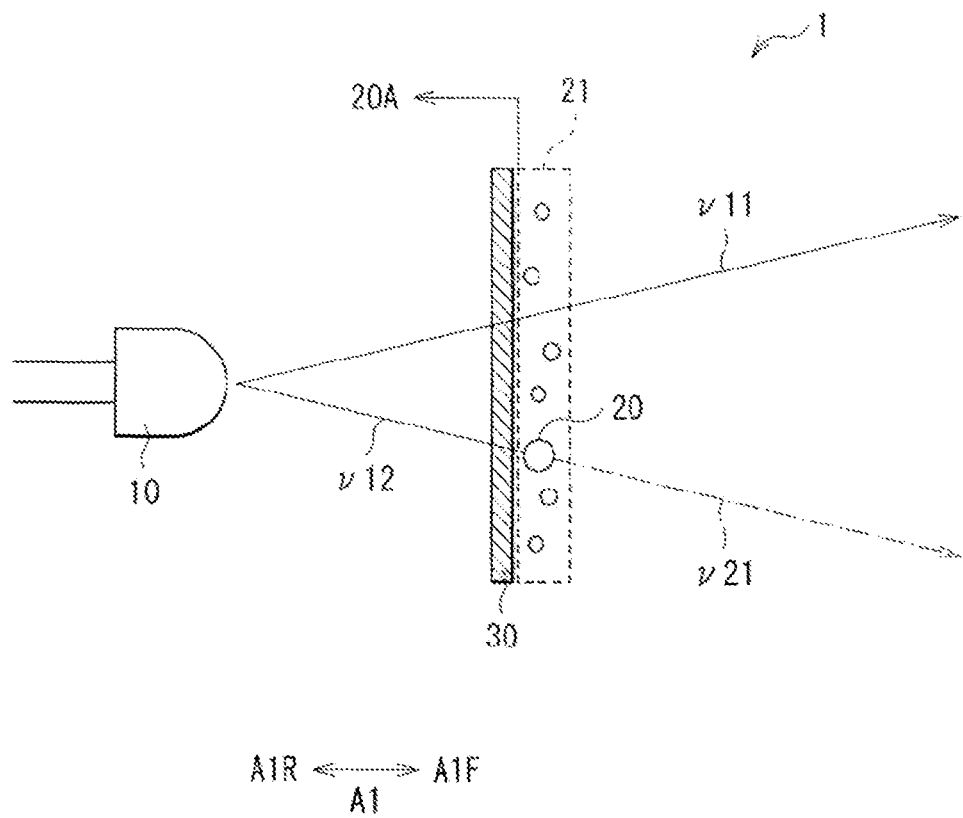

[ FIG. 2 ]
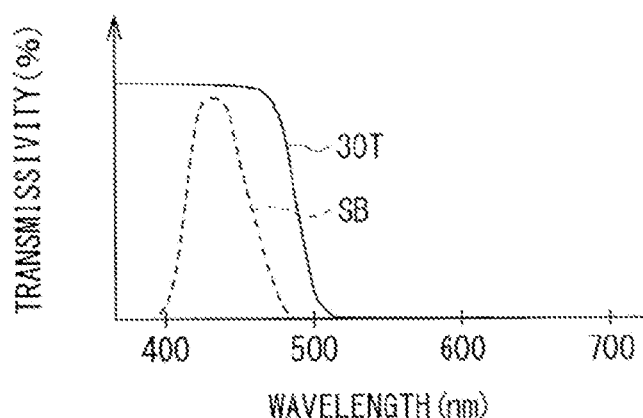
[ FIG. 3 ]
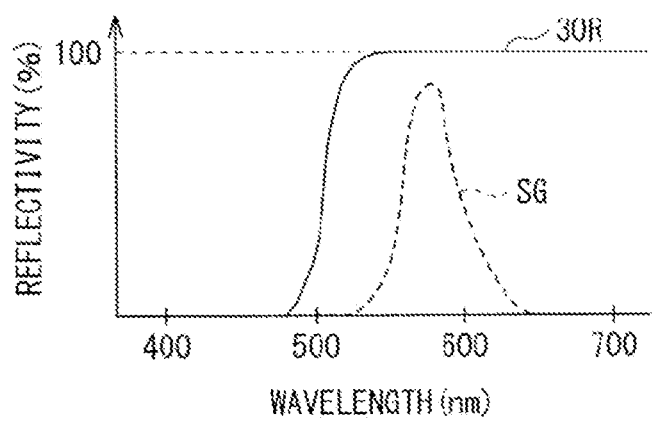

[ FIG. 4 ]
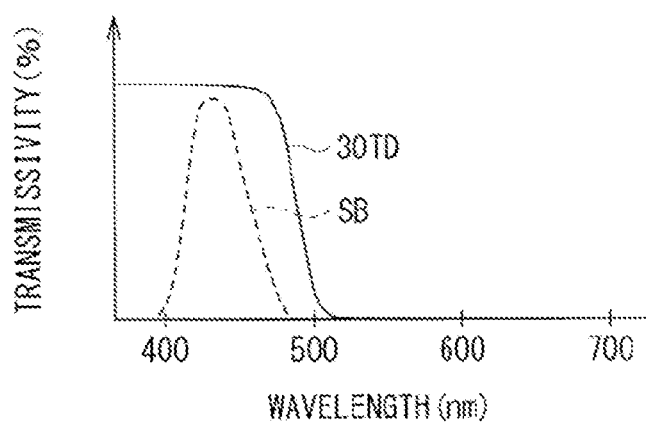
[ FIG. 5 ]
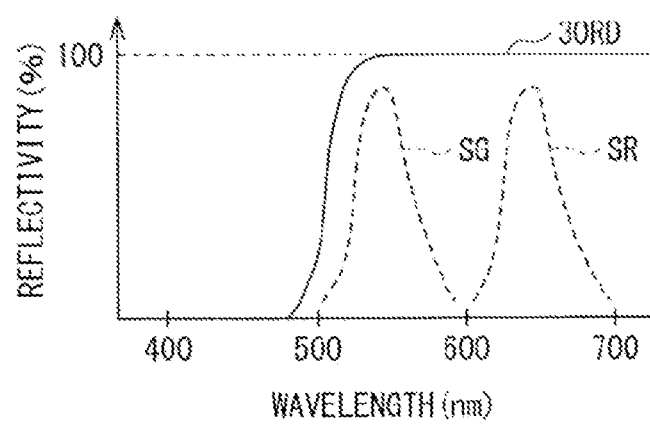

[ FIG. 6 ]
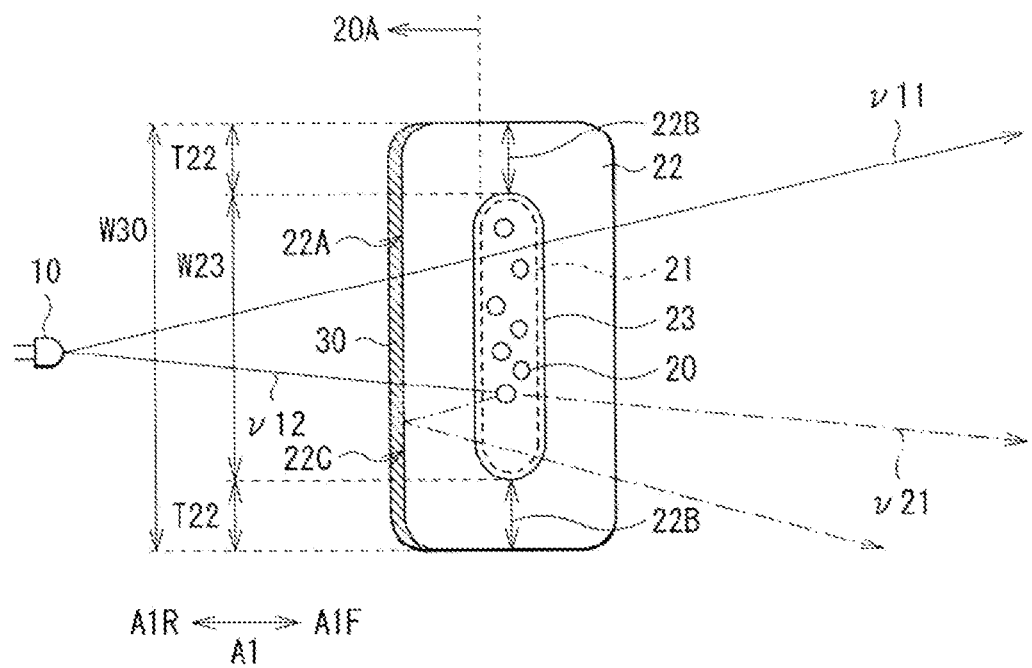
[ FIG. 7 ]
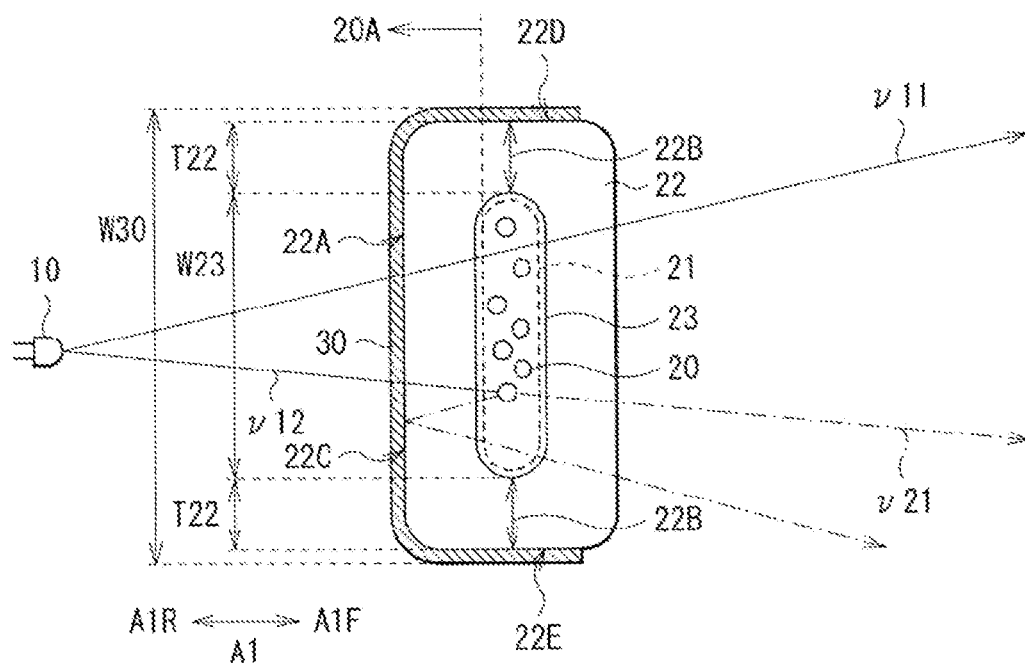

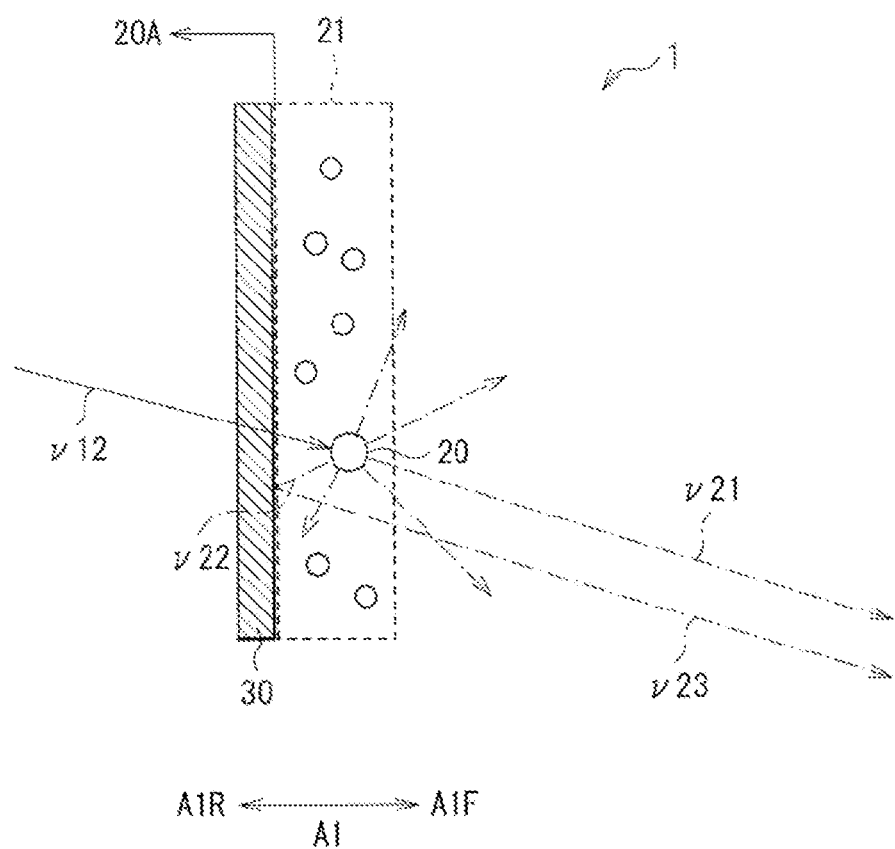
[FIG. 8]

[ FIG. 9 ]
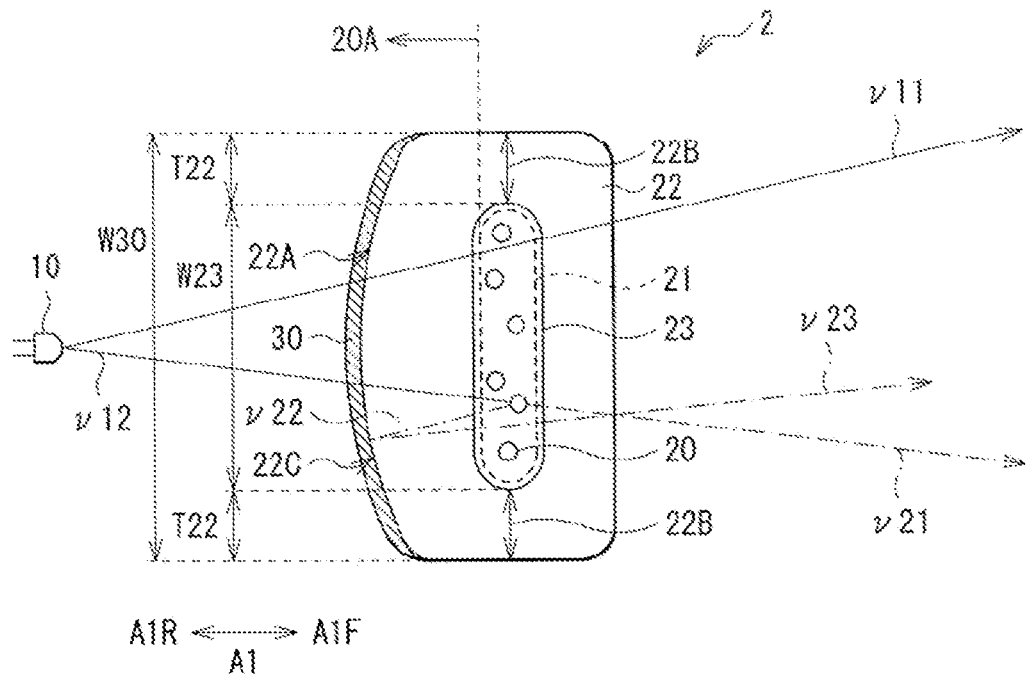
[ FIG. 10 ]
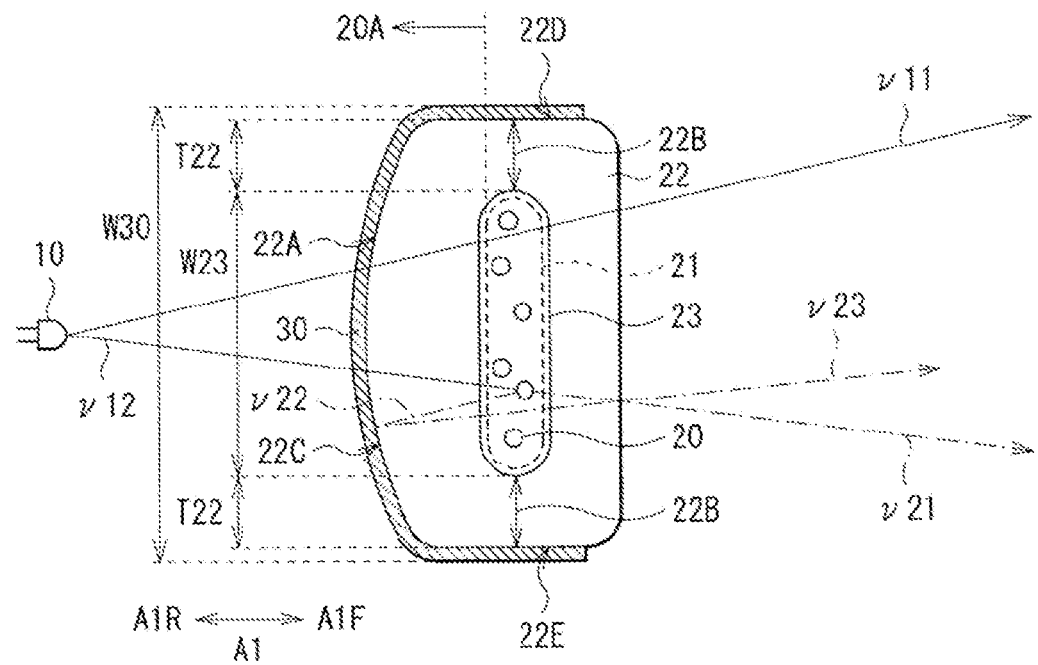

[FIG. 11]
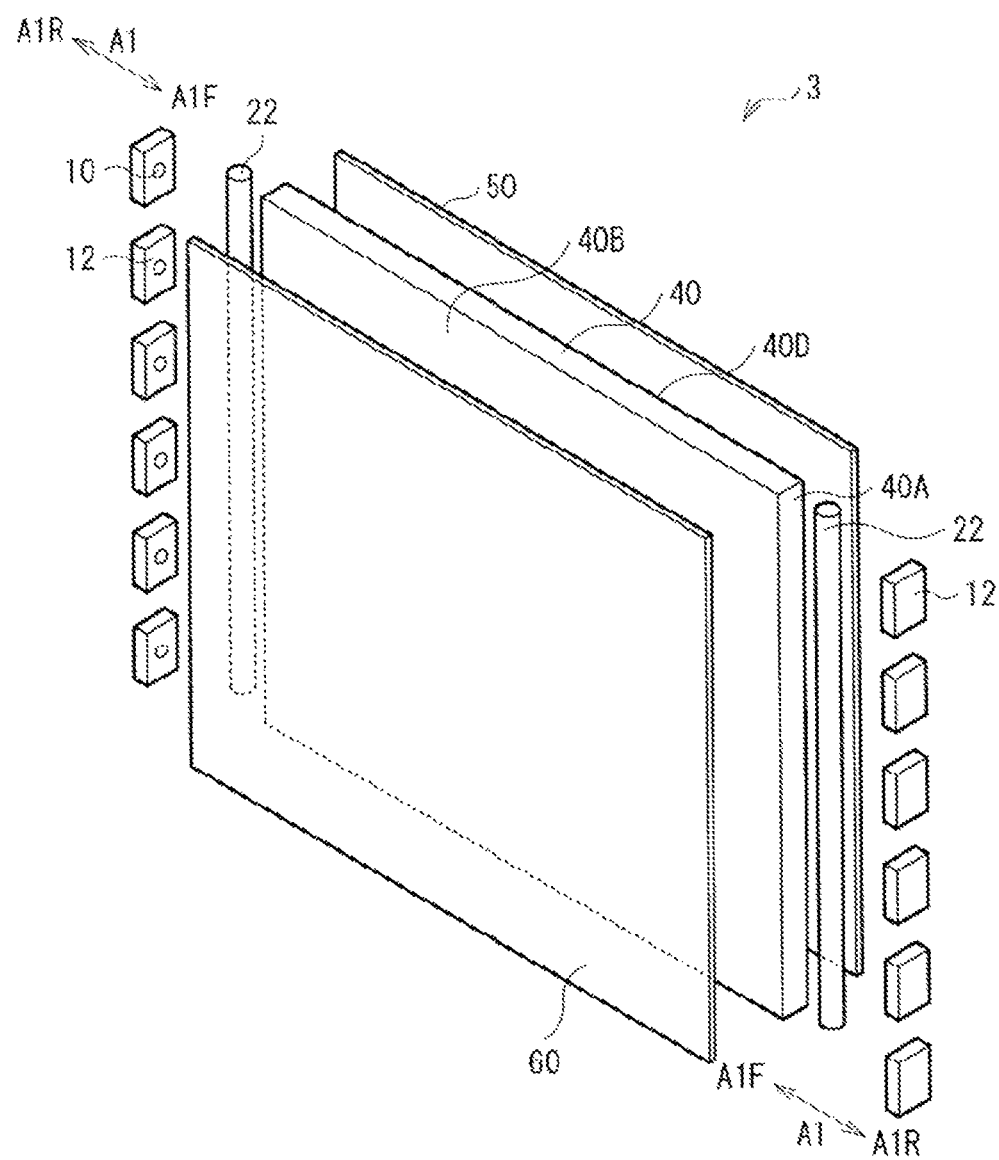

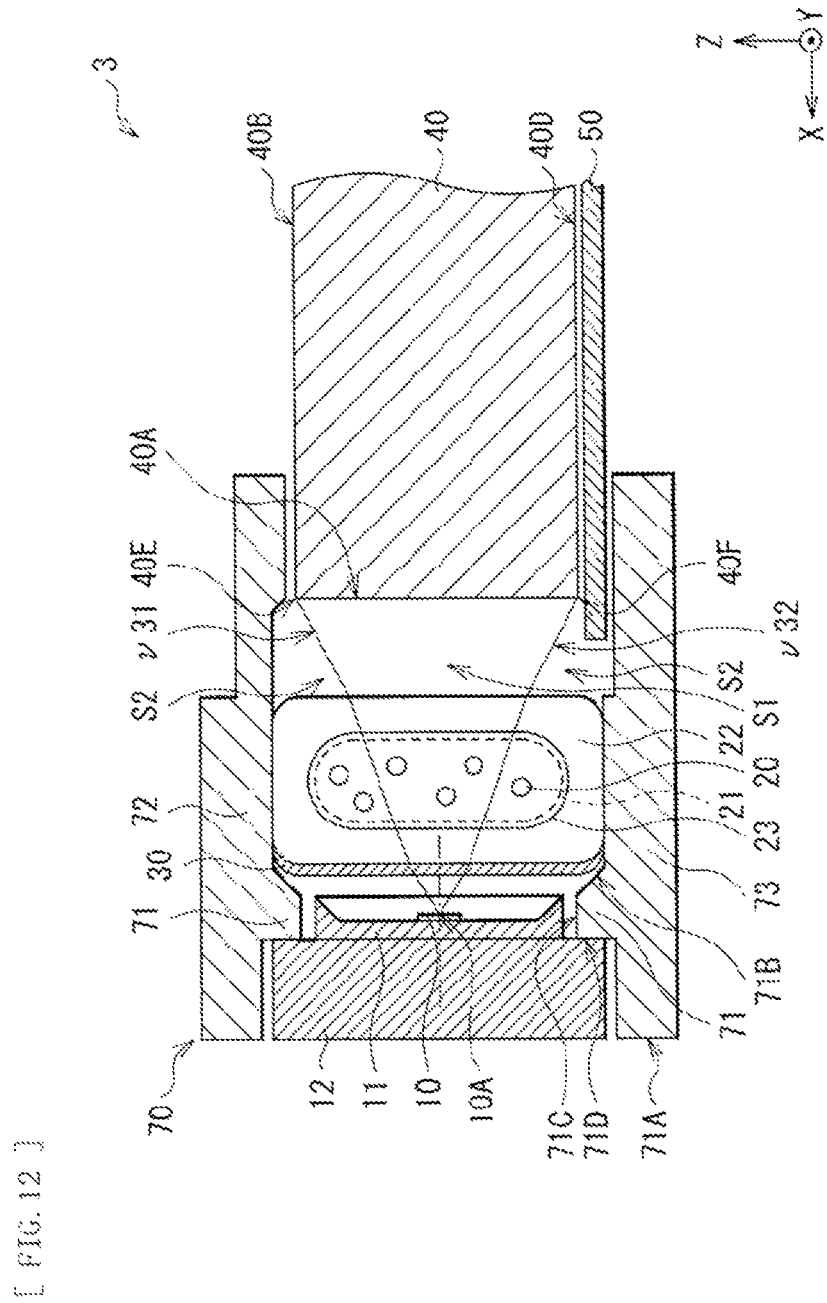
[ FIG. 12 ]

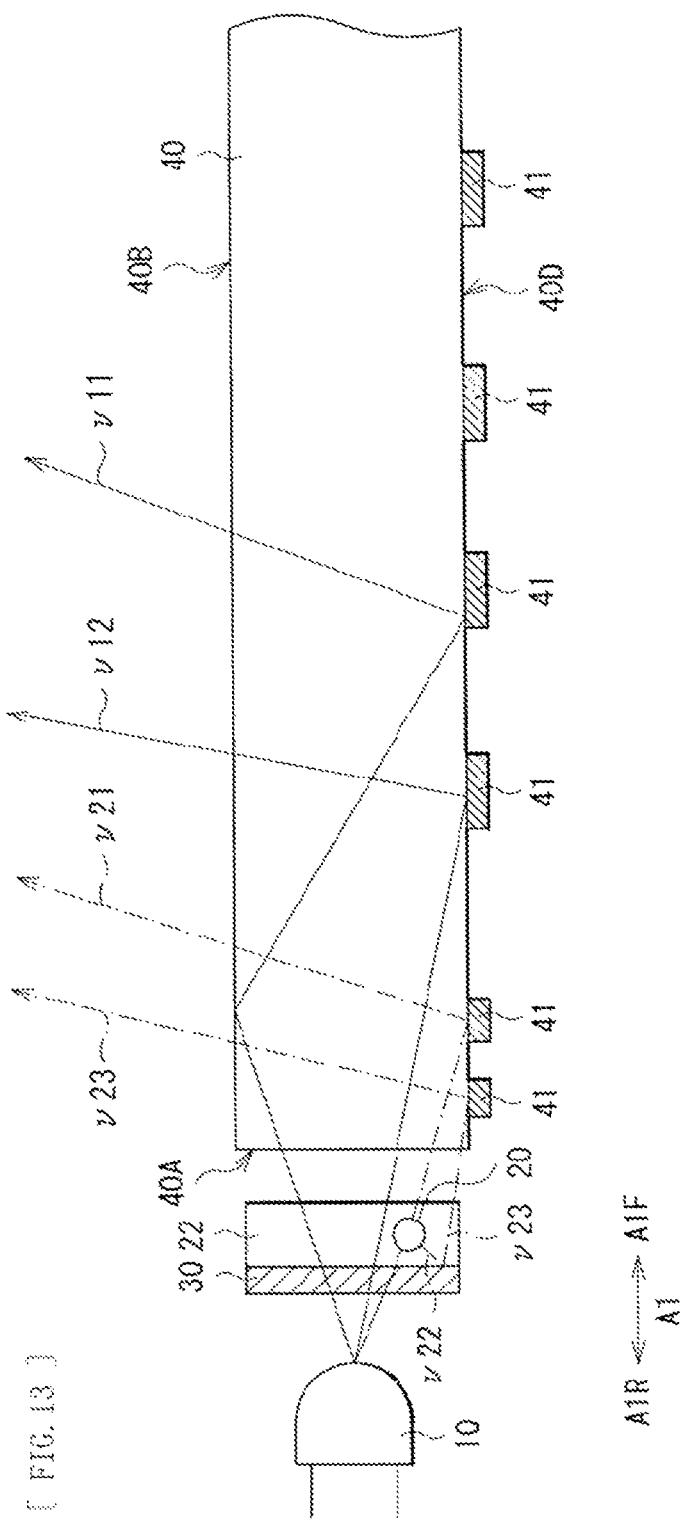

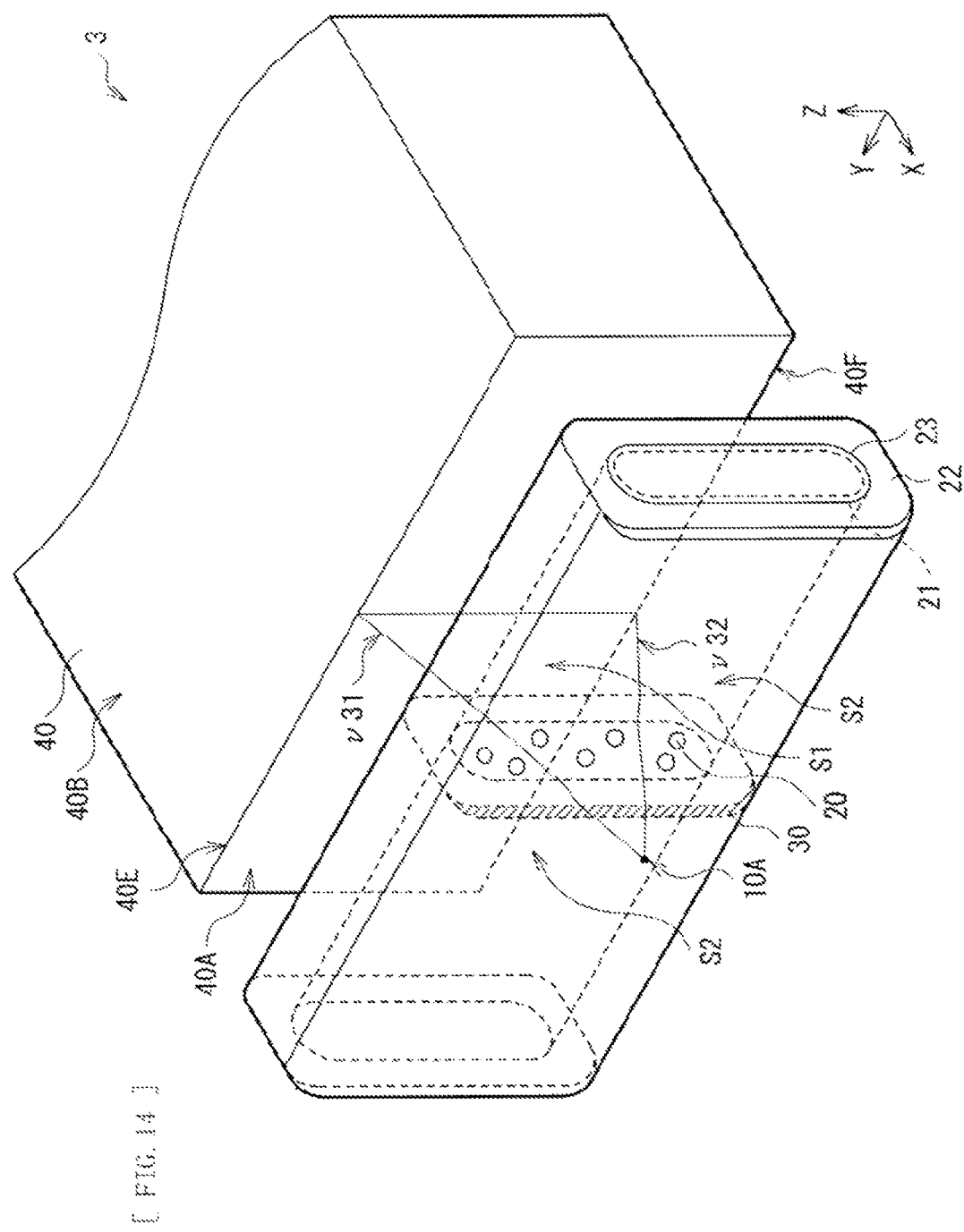
[ FIG. 14 ]

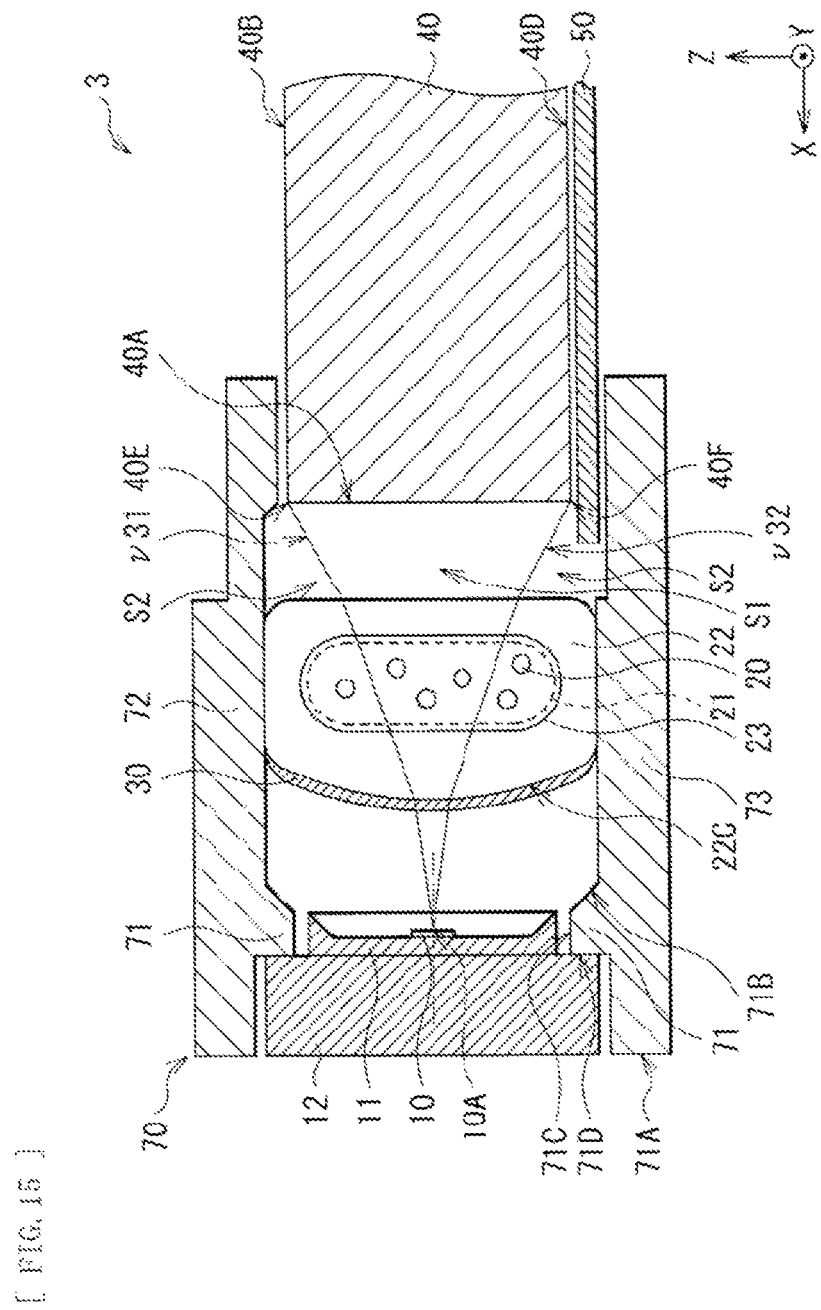
[ FIG. 15 ]

[ FIG. 16 ]
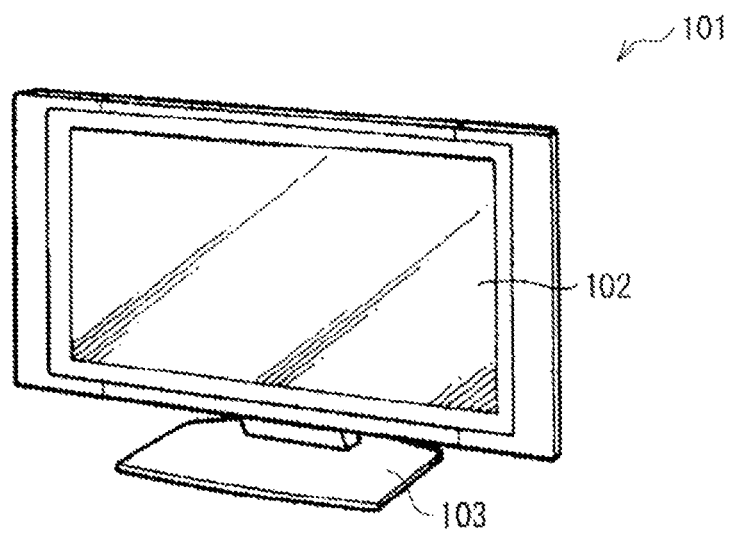

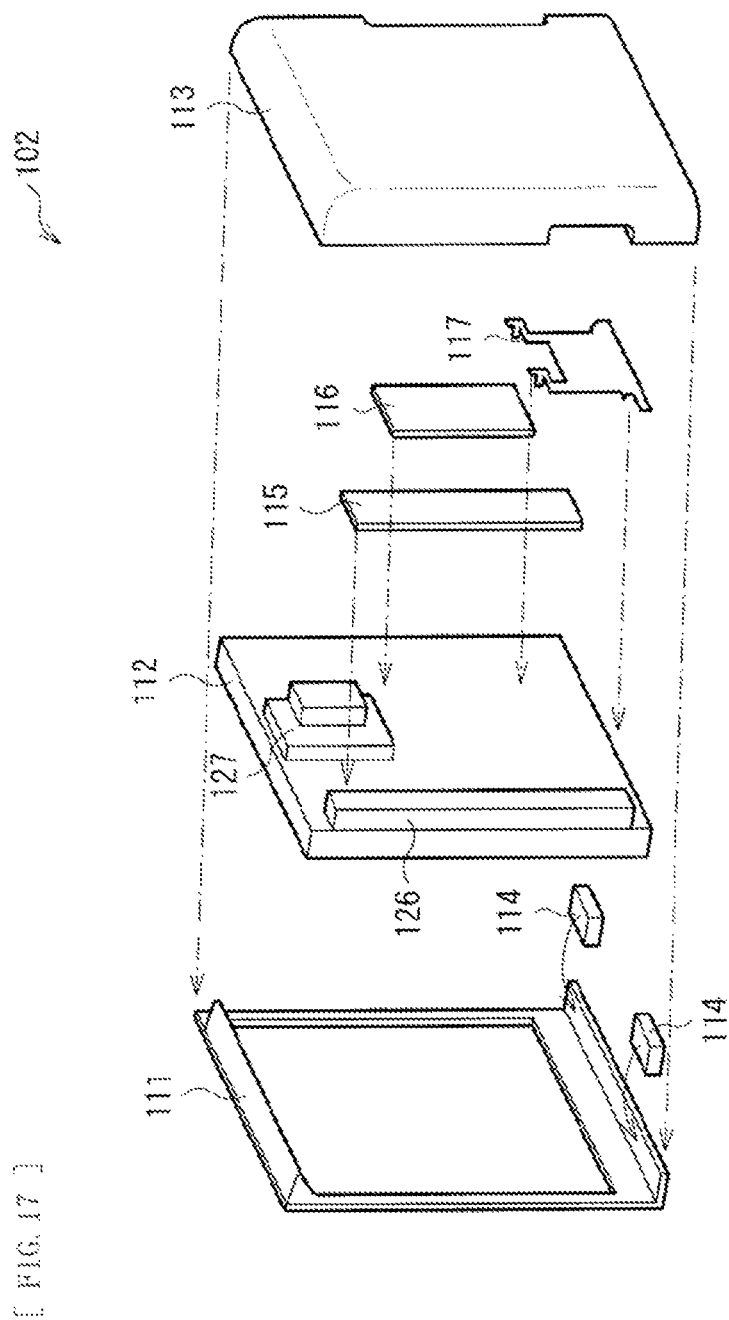

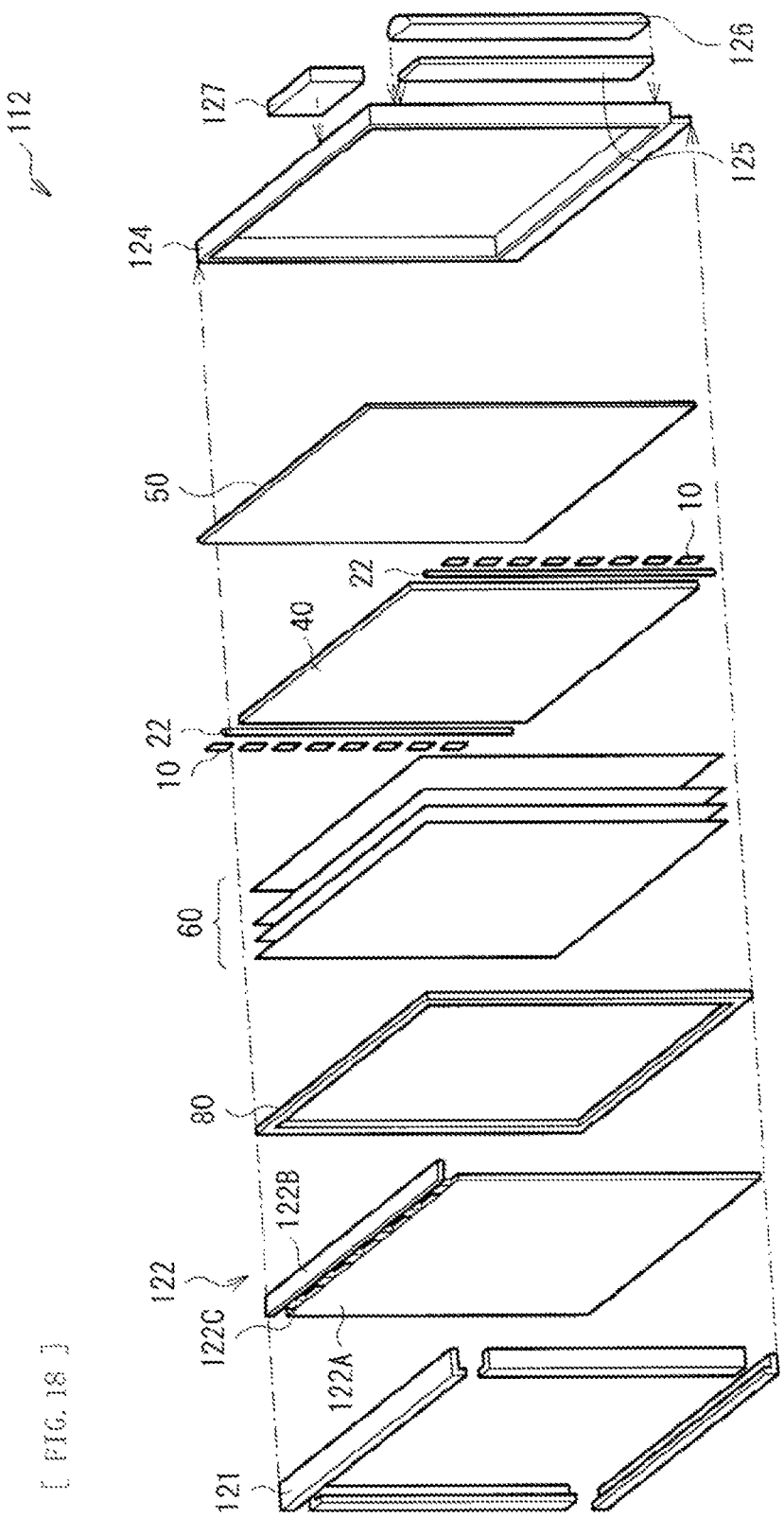

[ FIG. 19 ]
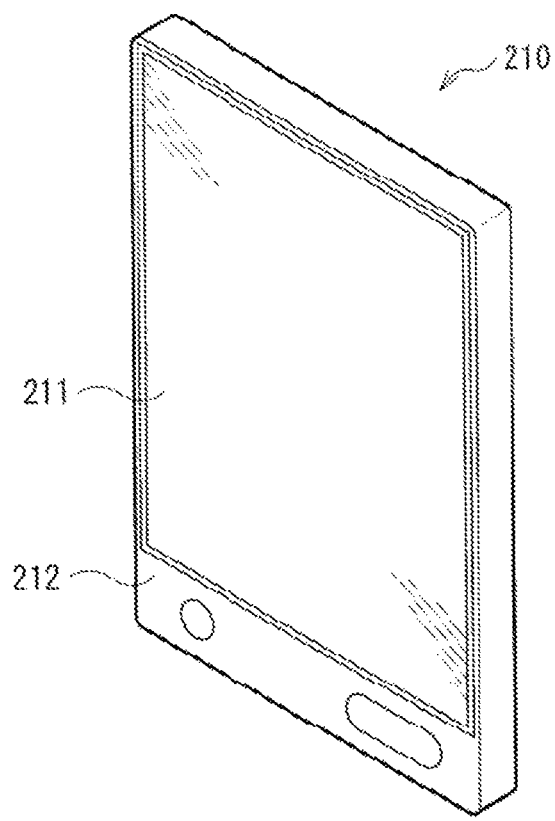
[ FIG. 20 ]
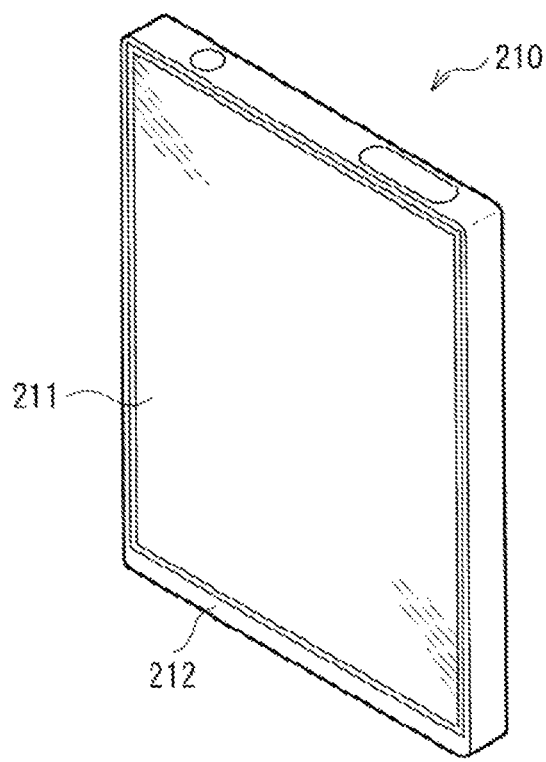

[ FIG. 21 ]
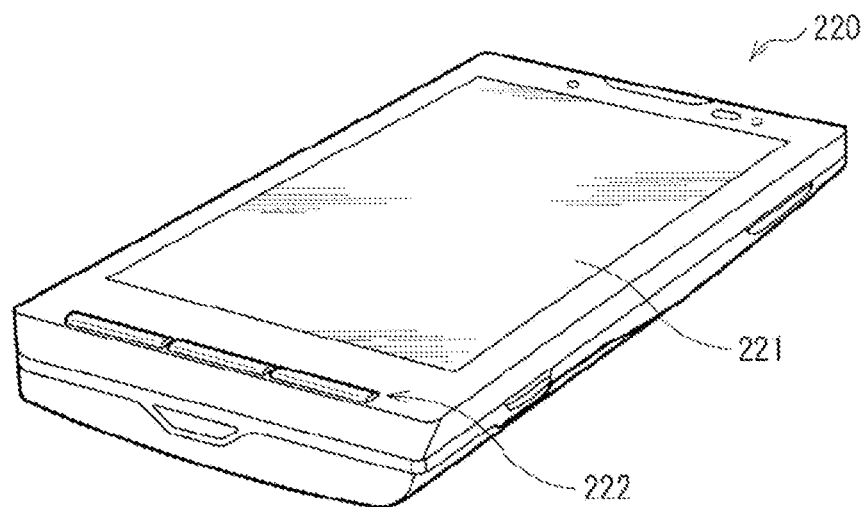
[ FIG. 22 ]
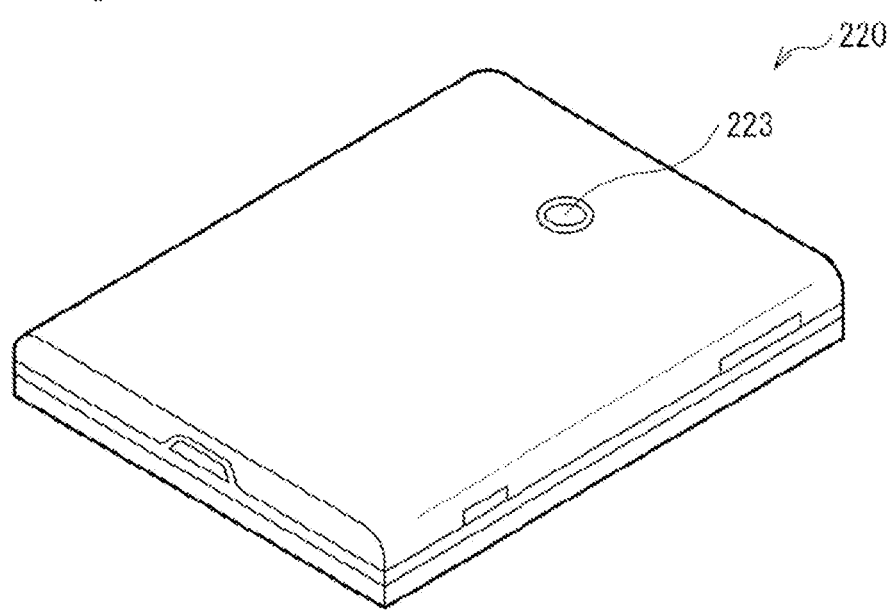

[ FIG. 23 ]
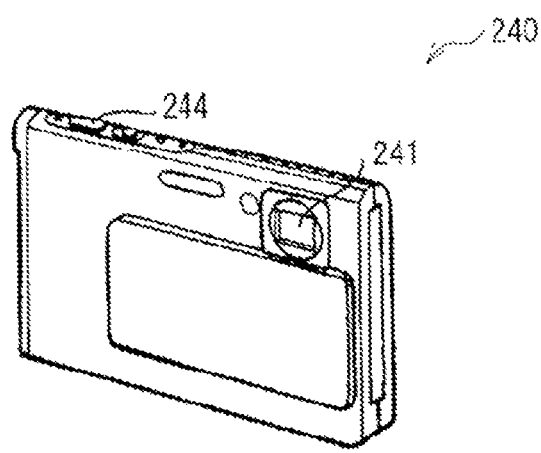
[ FIG. 24 ]
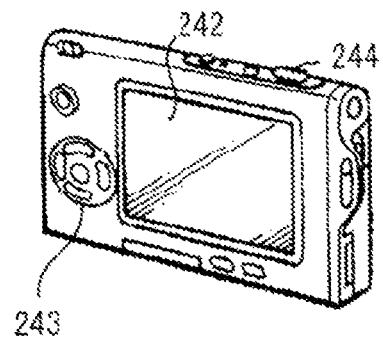

[ FIG. 25 ]
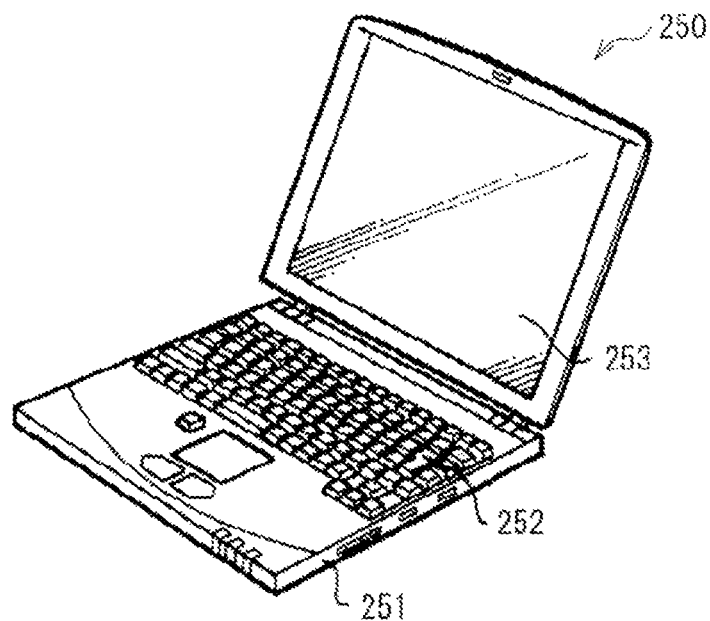
[ FIG. 26 ]
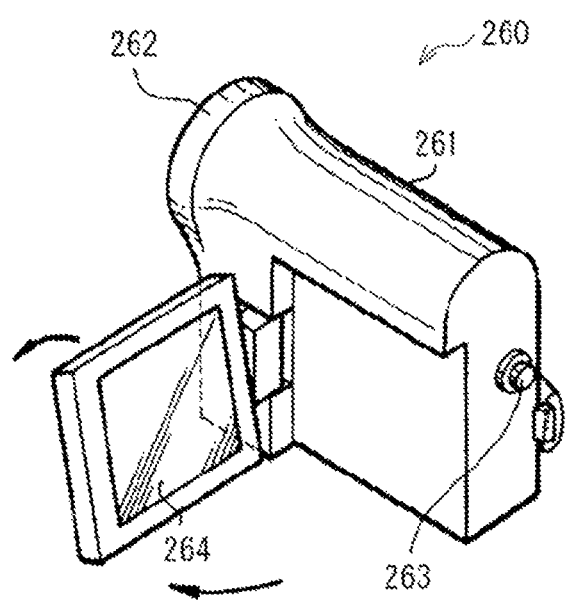

[ FIG. 27 ]
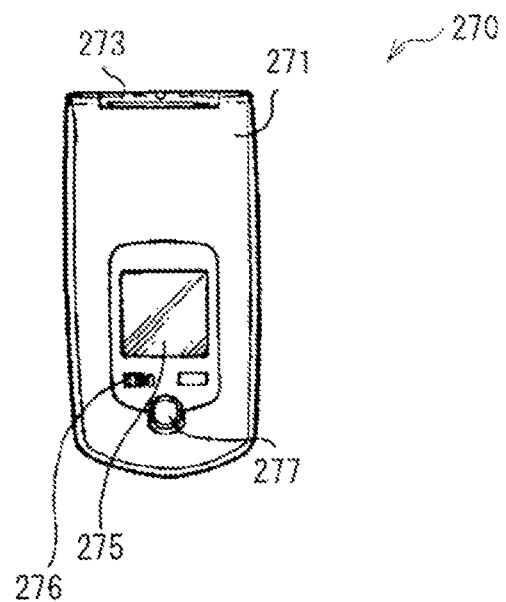
[ FIG. 28 ]
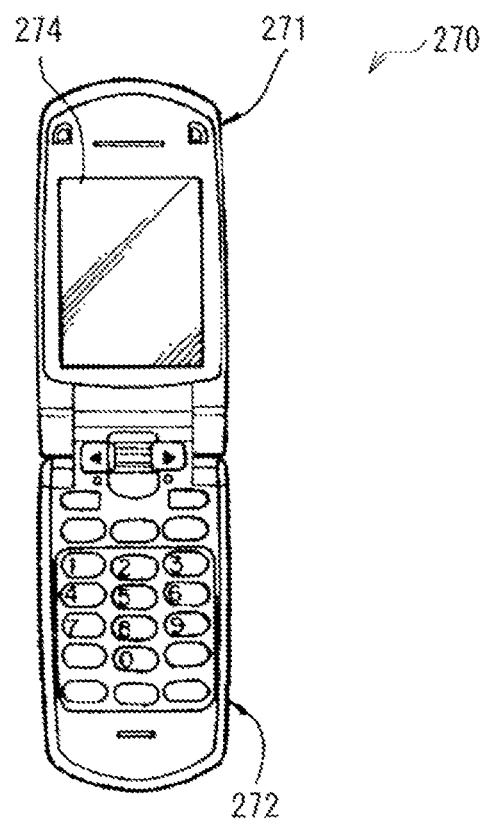

[FIG. 29]
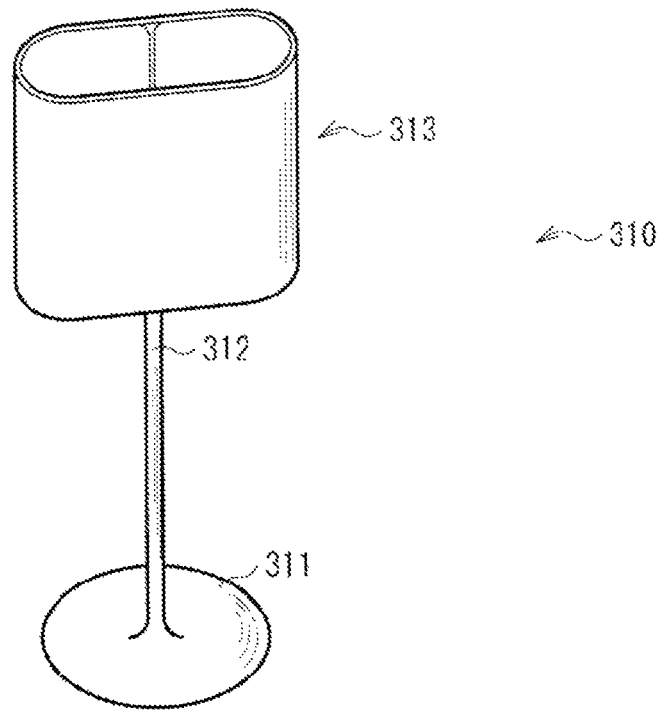
[FIG. 30]
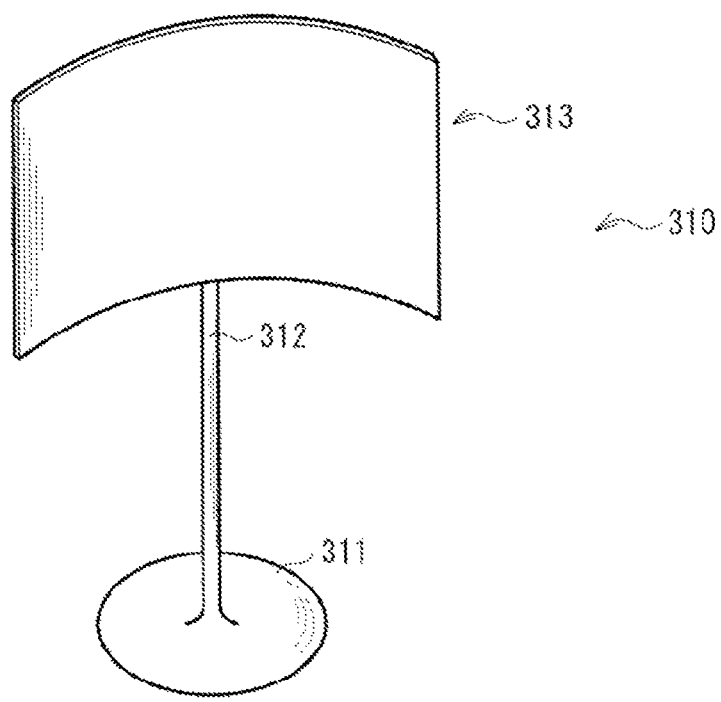

[ FIG. 31 ]
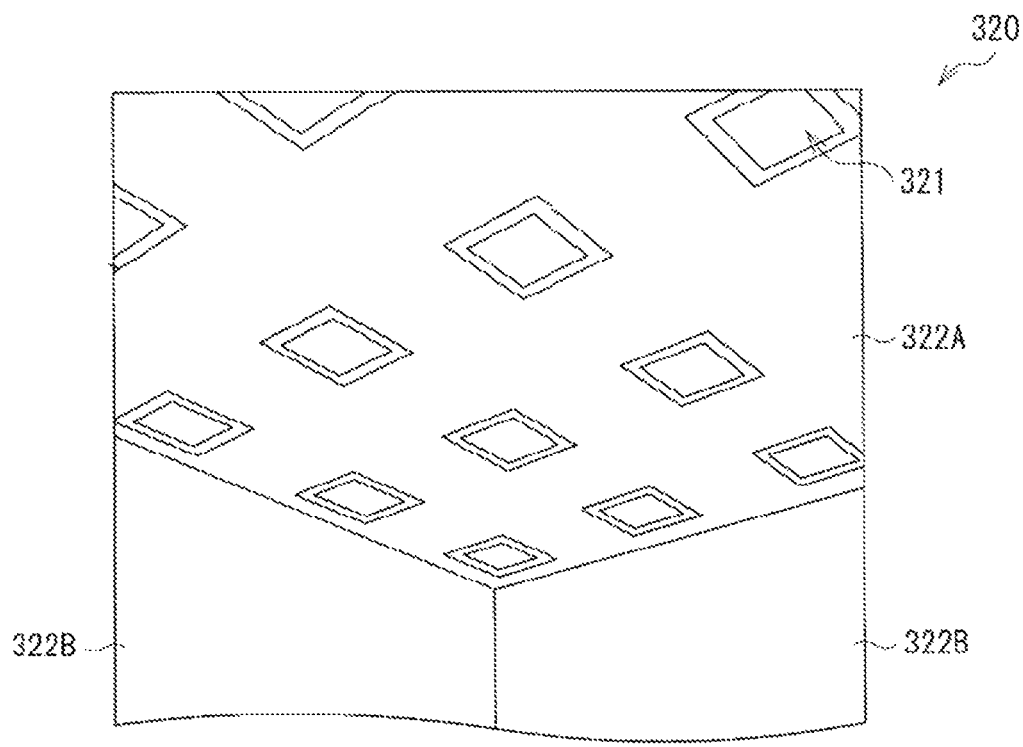

ILLUMINATION DEVICE AND DISPLAY DEVICE

CROSS-REFERENCE TO RELATED APPLICATIONS

The present application is a continuation of U.S. patent application Ser. No. 16/263,914, filed on Jan. 31, 2019, which is a continuation of U.S. patent application Ser. No. 15/850,489, filed on Dec. 21, 2017, issued on Mar. 26, 2019 as U.S. Pat. No. 10,240,750, which is a continuation of U.S. patent application Ser. No. 15/484,541, filed on Apr. 11, 2017, issued on Feb. 6, 2018 as U.S. Pat. No. 9,885,462, which is a continuation of U.S. patent application Ser. No. 14/439,873, filed on Apr. 30, 2015, issued on May 23, 2017, as U.S. Pat. No. 9,657,920, which is a national phase entry under 35 U.S.C. § 371 of International Application No. PCT/JP2013/077449, filed on Oct. 9, 2013, published on May 15, 2014 as WO 2014/073313 A1, which claims priority from Japanese Patent Application No. JP 2012-247262, filed in the Japanese Patent Office on Nov. 9, 2012, the disclosures of which are hereby incorporated herein by reference.

TECHNICAL FIELD

The present disclosure relates to an illumination device suitable for a surface light source, and a display device including this.

BACKGROUND ART

In an illumination device used in a backlight of a liquid crystal display device, or the like, there has been known an edge-type configuration in which, for example, a light source is disposed in the vicinity of a side surface (a light-incident surface) of a light guide plate. In the edge-type illumination device, light from the light source is allowed to enter the side surface of the light guide plate and to emit through a front surface of the light guide plate.

For example, Patent Literature 1 describes a dichroic mirror surrounding rearward of a cold cathode tube as a light source, in order to restrain degradation of the light guide plate. The dichroic mirror selectively transmits ultraviolet rays and selectively reflects at least visible rays. Behind the dichroic mirror, an ultraviolet ray absorption sheet is provided, and ultraviolet rays that have passed through the dichroic mirror are absorbed.

CITATION LIST

Patent Literature

Patent Literature 1: JP 2010-157468A

SUMMARY OF INVENTION

In an illumination device, in general, it is desirable to improve efficiency of utilizing light.

It is therefore desirable to provide an illumination device that makes it possible to improve efficiency of utilizing light, and a display device including this.

An illumination device according to an embodiment of the present disclosure includes: a light source that is configured to generate light of a first wavelength; a luminescent body that is configured to wavelength-convert the light of the first wavelength to light of a second wavelength, the second wavelength being different from the first wavelength; and a wavelength selective filter that is provided on a light-incident side of the luminescent body, the wavelength selective filter being configured to transmit the light of the first wavelength and to reflect the light of the second wavelength.

In the illumination device according to the embodiment of the present disclosure, the light of the first wavelength from the light source passes through the wavelength selective filter and travels toward the luminescent body. The light that collides with the luminescent body is wavelength-converted by the luminescent body to become the light of the second wavelength. The light that does not collide with the luminescent body passes as it is.

Here, the wavelength selective filter is configured to transmit the light of the first wavelength and to reflect the light of the second wavelength. This allows the light of the first wavelength generated from the light source to transmit the wavelength selective filter with little attenuation. Moreover, of the light of the second wavelength that has collided with the luminescent body and has been wavelength-converted, light travelling rearward is reflected by the wavelength selective filter, is radiated forward as reflected light, and is utilized effectively.

A display device according to an embodiment of the present disclosure is provided with a liquid crystal panel and an illumination device on a rear side of the liquid crystal panel, the illumination device including: a light source that is configured to generate light of a first wavelength; a luminescent body that is configured to wavelength-convert the light of the first wavelength to light of a second wavelength, the second wavelength being different from the first wavelength; and a wavelength selective filter that is provided on a light-incident side of the luminescent body, the wavelength selective filter being configured to transmit the light of the first wavelength and to reflect the light of the second wavelength.

In the display device according to the embodiment of the present disclosure, the light of the first wavelength or the light of the second wavelength from the illumination device is transmitted selectively by the liquid crystal panel. Thus, image display is performed.

According to the illumination device of the embodiment of the present disclosure, the wavelength selective filter is provided on the light-incident side of the luminescent body. The wavelength selective filter is configured to transmit the light of the first wavelength and to reflect the light of the second wavelength. Hence, it is possible to improve efficiency of utilizing light. Configuration of a display device with the illumination device makes it possible to reduce power consumption.

BRIEF DESCRIPTION OF DRAWINGS

FIG. 1 is a diagram illustrating an overall configuration of a main part of an illumination device according to a first embodiment of the present disclosure.

FIG. 2 is a diagram schematically illustrating a transmission characteristic of a wavelength selective filter illustrated in FIG. 1.

FIG. 3 is a diagram schematically illustrating a reflection characteristic of the wavelength selective filter illustrated in FIG. 1.

FIG. 4 is a diagram schematically illustrating a transmission characteristic of a wavelength selective filter in a display device application.

FIG. 5 is a diagram schematically illustrating a reflection characteristic of the wavelength selective filter in the display device application.

FIG. 6 is a cross-sectional view illustrating, in an enlarged manner, an example of an arrangement relation of a luminescent body and the wavelength selective filter illustrated in FIG. 1.

FIG. 8 is a cross-sectional view illustrating another example of the arrangement relation of the luminescent body and the wavelength selective filter illustrated in FIG. 1.

FIG. 7 is a diagram illustrating action of the illumination device illustrated in FIG. 1.

FIG. 9 is a cross-sectional view illustrating, in an enlarged manner, an example of the arrangement relation of the luminescent body and the wavelength selective filter in an illumination device according to a second embodiment of the present disclosure.

FIG. 10 is a cross-sectional view illustrating another example of the arrangement relation of the luminescent body and the wavelength selective filter illustrated in FIG. 9.

FIG. 11 is a perspective view illustrating an overall configuration of an illumination device according to a third embodiment of the present disclosure.

FIG. 12 is a cross-sectional view illustrating an arrangement relation of a light source, the luminescent body, the wavelength selective filter, and a light guide plate illustrated in FIG. 11.

FIG. 13 is a diagram illustrating action of the illumination device illustrated in FIG. 11.

FIG. 14 is a perspective view illustrating a bundle of rays travelling from the light source toward a light-incident surface of the light guide plate illustrated in FIG. 13.

FIG. 15 is a cross-sectional view illustrating an arrangement relation of the light source, the luminescent body, the wavelength selective filter, and the light guide plate in a modification example 2.

FIG. 16 is a perspective view illustrating an appearance of a display device according to a fourth embodiment of the present disclosure.

FIG. 17 is an exploded perspective view of a main body illustrated in FIG. 16.

FIG. 18 is an exploded perspective view of a panel module illustrated in FIG. 17.

FIG. 19 is a perspective view illustrating an appearance, viewed on a front side, of an application example 1 of the display device according to the above-mentioned example embodiment.

FIG. 20 is a perspective view illustrating an appearance, viewed on a rear side, of the application example 1 of the display device.

FIG. 21 is a perspective view illustrating an appearance, viewed on a front side, of an application example 2 of the display device.

FIG. 22 is a perspective view illustrating an appearance, viewed on a rear side, of the application example 2 of the display device.

FIG. 23 is a perspective view illustrating an appearance, viewed on a front side, of an application example 3 of the display device.

FIG. 24 is a perspective view illustrating an appearance, viewed on a rear side, of the application example 3 of the display device.

FIG. 25 is a perspective view illustrating an appearance of an application example 4 of the display device.

FIG. 26 is a perspective view illustrating an appearance of an application example 5 of the display device.

FIG. 27 is a perspective view illustrating an appearance of an application example 6 of the display device, in a closed state.

FIG. 28 is a perspective view illustrating an appearance of the application example 6 of the display device, in an opened state.

FIG. 29 is a perspective view illustrating an appearance of an application example 7 of the illumination device.

FIG. 30 is a perspective view illustrating an appearance of an application example 8 of the illumination device.

FIG. 31 is a perspective view illustrating an appearance of an application example 9 of the illumination device.

DESCRIPTION OF EMBODIMENTS

In the following, some embodiments of the present disclosure will be described in detail with reference to the drawings. It is to be noted that the order of description is as follows.

1. First Embodiment (an illumination device; an example in which a wavelength selective filter is provided on a light-incident side of a luminescent body)
2. Modification Example 1 (an illumination device; an example in which the luminescent body includes a sulfide phosphor)
3. Second Embodiment (an illumination device; an example in which a surface on which the wavelength selective filter is provided of the container is curved convexly toward a light source)
4. Third Embodiment (an illumination device; a backlight)
5. Modification Example 2 (an illumination device; a combination of the second and the third embodiments)
6. Fourth Embodiment (a display device; a liquid crystal display device)
7. Electronic Apparatus (application examples of the display device)
8. Illumination Apparatus (application examples of the illumination device)

First Embodiment

FIG. 1 illustrates an overall configuration of a main part of an illumination device according to a first embodiment of the present disclosure. The illumination device 1 may be used as a backlight that illuminates a transmissive liquid crystal panel from behind, or as an illumination apparatus indoors or the like, and may include, for example, a light source 10, a luminescent body 20, and a wavelength selective filter 30.

In the present embodiment, in an arrangement direction A1 of the light source 10, the luminescent body 20, and the wavelength selective filter 30, a direction from the light source 10 toward the luminescent body 20 is referred to as forward A1F, while a direction from the luminescent body 20 to the light source 10 is referred to as rearward A1R.

The light source 10 is configured to generate light v11 and v12 of a specific wavelength (a first wavelength λ1). The light source 10 may be, for example, a point light source, and specifically, may be configured of an LED (Light Emitting Diode).

The luminescent body 20 may include a luminescent body having a function of wavelength conversion, for example, a phosphor (a fluorescent substance) such as a fluorescent pigment or a fluorescent dye, or a quantum dot. The luminescent body 20 is configured to be excited by the light v11 and v12 of the first wavelength, and to produce light by wavelength-converting the light v11 and v12 of the first wavelength to light v21 of another wavelength (a second wavelength λ2) different from the first wavelength, by a principle of fluorescence emission or the like. In FIG. 1, the light v11 and v12 of the first wavelength is denoted by a solid line while the light v21 of the second wavelength is denoted by a dashed line.

The first wavelength λ1 and the second wavelength λ2 are not limited in particular; for example, in a case of a display device application, the light v11 and v12 of the first wavelength may be blue light (of a wavelength of, for example, about 440 to 460 nm both inclusive), while the light v21 of the second wavelength may be red light (of a wavelength of, for example, about 620 nm to 750 nm both inclusive), or green light (of a wavelength of, for example, about 495 nm to 570 nm both inclusive). In other words, the light source 10 may be a blue light source, and the luminescent body 20 is configured to wavelength-convert blue light to red light or green light.

The luminescent body 20 may preferably include a quantum dot. A quantum dot is a particle having a longer axis of about 1 nm to 100 nm both inclusive, and has discrete energy levels. Since an energy state of a quantum dot depends on its size, a change in size allows a free choice of a wavelength of light emission. Moreover, light emitted by a quantum dot has a narrow spectrum width. Combination of light having such steep peaks allows expansion of a color gamut. Accordingly, the use of a quantum dot for the luminescent body 20 makes it possible to easily expand a color gamut. Furthermore, a quantum dot has a high response speed, making it possible to utilize effectively light from the light source 10. In addition, a quantum dot has high stability. A quantum dot may be, for example, a compound of a group 12 element and a group 16 element, a compound of a group 13 element and a group 16 element, or a compound of a group 14 element and a group 16 element. Examples may include CdSe, CdTe, ZnS, CdS, PbS, PbSe, Cd HgTe, and so forth.

It is to be noted that FIG. 1 represents the luminescent body 20 as a particle like a quantum dot for simplicity. However, it goes without saying that the luminescent body 20 is not limited to a particle. Moreover, FIG. 1 represents a region in which the luminescent body 20 is disposed (hereinafter referred to as a luminescent body disposed region 21) by surrounding it by a dotted line.

The wavelength selective filter 30 is provided on a light-incident side 20A of the luminescent body 20, and is configured to transmit the light v11 and v12 of the first wavelength and to reflect the light v21 of the second wavelength. Thus, in the illumination device 1, it is possible to improve efficiency of utilizing light.

Here, the light-incident side 20A of the luminescent body 20 refers to a special region on the rearward A1R side (on the light source 10 side) in the arrangement direction A1, compared to the luminescent body disposed region 21. Specifically, the light-incident side 20A of the luminescent body 20 refers to between the light source 10 and the luminescent body disposed region 21.

FIG. 2 schematically illustrates an example of a transmission characteristic 30T of the wavelength selective filter 30. FIG. 2 represents a spectrum SB of blue light as well. As illustrated in FIG. 2, in a case that the light v11 and v12 of the first wavelength is, for example, blue light, the wavelength selective filter 30 may have high transmissivity in a wavelength range of, for example, about 500 nm or less that includes a wavelength band of blue light.

FIG. 3 schematically illustrates an example of a reflection characteristic 30R of the wavelength selective filter 30. FIG. 3 represents a spectrum SG of green light as well. As illustrated in FIG. 3, in a case that the light v21 of the second wavelength is, for example, green light, the wavelength selective filter 30 may have high reflectivity in a wavelength range of, for example, about 500 nm or more that includes a wavelength band of green light.

FIGS. 4 and 5 schematically illustrate an example of a transmission characteristic 30TD and a reflection characteristic 30RD, respectively, of the wavelength selective filter 30 in a display device application. FIGS. 4 and 5 represent a spectrum SR of red light, the spectrum SG of green light, and the spectrum SB of blue light as well. As illustrated in FIGS. 4 and 5, the wavelength selective filter 30 may have high transmissivity in a wavelength range of, for example, about 500 nm or less that includes the light v11 and v12 of the first wavelength, that is, the wavelength band of blue light. The wavelength selective filter 30 may have high reflectivity in a wavelength range of, for example, about 500 nm or more that includes the light v21 of the second wavelength, that is, the wavelength band of red light or green light.

The wavelength selective filter 30 as described above may be configured of, for example, a dielectric multilayer film. Specifically, the wavelength selective filter 30 may have a structure of lamination of a number of dielectric layers having thicknesses of about ¼ (a quarter) of the second wavelength and having different refractive indexes from one another. Thus, the wavelength selective filter 30 is configured to reflect selectively the light v21 of the second wavelength and to transmit selectively the light v11 and v12 of the first wavelength.

FIG. 6 illustrates, in an enlarged manner, an example of an arrangement relation of the luminescent body 20 and the wavelength selective filter 30 illustrated in FIG. 1. The luminescent body 20 may preferably be accommodated and sealed in a tubular container (capillary) 22 made of glass or the like. This makes it possible to restrain characteristic changes of the wavelength conversion member 30 due to moisture or oxygen in the air and to facilitate handling.

The container 22 may have a shape of a cuboid (including a shape that can be called a substantially cuboid even if there is a subtle deformation such as a rounded side or the like). The container 22 may be disposed with a surface of the cuboid facing the light source 10. The container 22 may include, in its inside, a hollow part that serves as an accommodating section 23 of the luminescent body 20. It goes without saying that the accommodating section 23 corresponds to the above-mentioned luminescent body disposed region 21.

Preferably, the wavelength selective filter 30 may be provided on an outer surface 22A on the light-incident side of the container 22. This is because, since the luminescent body 20 is a diverging light source, it is desirable that the wavelength selective filter 30 be disposed at a close distance from the luminescent body 20, in order to further improve efficiency of utilizing light. Moreover, it is possible to eliminate a gap between the container 22 and the wavelength selective filter 30, making it possible to reduce light leaks and to restrain lowering of efficiency of utilizing light. Furthermore, coating on glass is easy, making it possible to form the wavelength selective filter 30 easily.

A width W30 of the wavelength selective filter 30 may be preferably larger than a width W23 of the accommodating section 23. This makes it possible to reduce the light of the first wavelength that passes through a glass part 22B of the container 22 without passing through the accommodating section 23, leading to enhanced color uniformity in a plane.

The wavelength selective filter 30 may be preferably provided at least on a surface 22C that faces the light source 10 of the container 22. In this way, the width W30 of the wavelength selective filter 30 becomes equal to or substantially equal to a value obtained by adding twice of a thickness T22 of the container 22 to the width W23 of the accommodating section 23. Accordingly, it is possible to make the width W30 of the wavelength selective filter 30 larger than the width W23 of the accommodating section 23 securely.

Furthermore, the wavelength selective filter 30 may preferably extend, as illustrated in FIG. 7, beyond the surface 22C that faces the light source 10 of the container 22, on at least part (part or all) of surfaces 22D and 22E adjacent to the facing surface 22C. This makes it possible to capture light that travels around the adjacent surfaces 22D and 22E.

The luminescent body 20 and the wavelength selective filter 30 that are illustrated in FIG. 6 or 7 may be manufactured, for example, as follows.

First, for example, a fluorescent substance or a quantum dot is kneaded into a ultraviolet curing resin. A mixture thus obtained is put in the container 22 such as a glass tube, and one end of the container 22 is sealed. The resin is cured by ultraviolet irradiation, to form the luminescent body 20 in a resin form having viscosity to some extent. Subsequently, a dielectric multilayer film is coated by sputtering on the outer surface 22A on the light-incident side of the container 22, to form the wavelength selective filter 30. At this occasion, a surface treatment of the glass tube of the container 22 is unnecessary; washing its surfaces may be enough.

In the illumination device 1, the light source 10 generates the light v11 and v12 of the first wavelength. The light v11 and v12 passes through the wavelength selective filter 30 and travels toward the luminescent body 20. The light v12 that collides with the luminescent body 20 is wavelength-converted by the luminescent body 20 to become the light v21 of the second wavelength. The light v11 that does not collide with the luminescent body 20 passes as it is.

Here, the wavelength selective filter 30 is configured to transmit the light v11 and v12 of the first wavelength and to reflect the light v21 of the second wavelength. This allows the light v11 and v12 of the first wavelength generated from the light source 10 to transmit the wavelength selective filter 30 with little attenuation and to travel toward the luminescent body 20.

When the light v12 collides with the luminescent body 20, as illustrated in FIG. 8, the luminescent body 20 allows the wavelength-converted light v21 of the second wavelength to be emitted omnidirectionally from the luminescent body 20. As the light v21, there may be light that is emitted from the luminescent body 20 at a substantially same angle as that of light-incidence. On the other hand, as the light v22, there may be a bundle of rays that is emitted rearward A1R (toward the wavelength selective filter 30).

Here, the wavelength selective filter 30 is configured to transmit the light v11 and v12 of the first wavelength and to reflect the light v21 and v22 of the second wavelength. Therefore, the light v22 is reflected by the wavelength selective filter 30, is radiated forward A1F as reflected light v23, and is utilized effectively.

As described above, in the present embodiment, the wavelength selective filter 30 is provided on the light-incident side 20A of the luminescent body 20. The wavelength selective filter 30 is configured to transmit the light v11 and v12 of the first wavelength and to reflect the light v21 and v22 of the second wavelength. Hence, it is possible to allow nearly half of the light that has been wavelength-converted by the luminescent body 20 to be reflected by the wavelength selective filter 30, to alter the direction of their travel to allow them to be emitted forward A1F, and to improve efficiency of utilizing light.

Also, effective utilization of light leads to improvement in light emission efficiency of the whole system, making it possible to enhance brightness of the illumination device 1. Further, effective utilization of light leads to improvement in light emission efficiency of the whole system, making it possible to reduce power for the light source 10, which contributes to lower power consumption of the illumination device 1. In addition, effective utilization of light leads to improvement in light emission efficiency of the whole system, making it possible to reduce the number of LEDs or the like that constitute the light source 10, pursuing cost reduction.

In particular, the luminescent body 20 is accommodated in the container 22, and the wavelength selective filter 30 is provided on the outer surface 22A on the light-incidence side of the container 22. Hence, it is possible to decrease a distance between the luminescent body 20 and the wavelength selective filter 30, making it possible to reduce light leaks and to further improve efficiency of utilizing light.

Moreover, in particular, the container 22 includes, in its inside, the accommodating section 23 of the luminescent body 20, and the width W30 of the wavelength selective filter 30 is larger than the width W23 of the accommodating section 23. Hence, it is possible to reduce leaks of the light v11 and v12 of the first wavelength, making it possible to enhance color uniformity in a plane.

Modification Example 1

It is to be noted that, in the above-described first embodiment, description has been given on a case that the luminescent body 20 includes a fluorescent substance or a quantum dot. However, the above-described first embodiment may be suitably applied to a case that the luminescent body 20 includes a sulfide phosphor. A sulfide phosphor has a property of being chemically unstable, easily deteriorated in the air, and difficult to handle. Accordingly, also in a case of using a sulfide phosphor as the luminescent body 20, by sealing and closing the luminescent body 20 in the container 22 similarly to the above-described first embodiment, it is possible to obtain effects of restraining characteristic changes due to moisture or oxygen in the air and facilitating handling.

Examples of sulfide phosphors that generate green light as the light v21 of the second wavelength may include SrGa2S4:Eu (strontium thiogallate). Examples of sulfide phosphors that generate red light as the light v21 of the second wavelength may include CaS:Eu (calcium sulfide).

Second Embodiment

FIG. 9 illustrates, in an enlarged manner, an example of an arrangement relation of the luminescent body 20 and the wavelength selective filter 30 in an illumination device 2 according to a second embodiment of the present disclosure. In the illumination device 2, the surface 22C that faces the light source 10 of the container 22 is curved convexly toward the light source 10, enhancing a light condensing effect. Otherwise, the illumination device 2 has similar configurations, actions, and effects to those of the above-described first embodiment. Therefore, description will be given with similar components denoted by similar reference numerals.

The light source 10, the luminescent body 20, the luminescent body disposed region 21, and the wavelength selective filter 30 may be configured similarly to those of the first embodiment.

In the container 22, as mentioned above, the surface 22C that faces the light source 10 is curved convexly toward the light source 10. In this way, the inside surface of the facing surface 22C has a function as a concave mirror, enhancing a light condensing effect and leading to further improvement in efficiency of utilizing light.

The wavelength selective filter 30 may be preferably provided on the outer surface 22A on the light-incident side of the container 22, similarly to the first embodiment.

The width W30 of the wavelength selective filter 30 may be preferably larger than the width W23 of the accommodating section 23, similarly to the first embodiment.

The wavelength selective filter 30 may be preferably provided at least on the surface 22C that faces the light source 10 of the container 22, similarly to the first embodiment.

Furthermore, the wavelength selective filter 30 may preferably extend, as illustrated in FIG. 10, beyond the surface 22C that faces the light source 10 of the container 22, on part or all of the surfaces 22D and 22E adjacent to the facing surface 22C. This makes it possible to capture light that travels around the adjacent surfaces 22D and 22E.

In the illumination device 2, since the surface 22C that faces the light source 10 of the container 22 is curved convexly toward the light source 10, the inside surface of the facing surface 22C has a function as a concave mirror. Accordingly, the light v22 of the second wavelength is reflected by the wavelength selective filter 30, and the reflected light v23 is easily condensed inward to be utilized more effectively.

Third Embodiment

FIG. 11 illustrates an overall configuration of an illumination device according to a third embodiment of the present disclosure. The illumination device 3 may include, as its main part, the illumination device 1 according to the first embodiment. In other words, the illumination device 3 may include a light guide plate 40, a reflection member 50, and an optical sheet 60, in addition to the light source 10, the luminescent body 20, and the container 22 on which the wavelength selective filter 30 is provided, as described in the first embodiment. The light guide plate 40 corresponds to a specific example of "an optical member" in the present disclosure.

In the present embodiment and later, a stacking direction of the optical sheet 60, the light guide plate 40, and the reflection member 50 is referred to as a Z direction (a front-rear direction). In a main surface (a largest surface) of the light guide plate 40, a horizontal direction is referred to as an X direction, and a vertical direction is referred to as a Y direction.

The light source 10 may be configured similarly to that of the first embodiment. For example, the light source 10 may be sealed in a package 11 (not illustrated in FIG. 11, refer to FIG. 12.), mounted on light source substrates 12, and disposed facing a light-incident surface 40A of the light guide plate 40. The light source substrates 12 may have a shape of an elongated cuboid, and may be arranged in a line in a longitudinal direction of the light source substrates 12.

In an example illustrated in FIG. 11, the light-incident surface 40A may be a right end surface and a left end surface of the light guide plate 40. Accordingly, the arrangement direction A1, forward A1F, and rearward A1R are directions parallel to the horizontal direction X in FIG. 11.

The luminescent body 20 and the wavelength selective filter 30 may be configured similarly to those of the first embodiment.

The light guide plate 40 is configured to guide the light from the light source 10 from the light-incident surface 40A toward a light-emission surface 40B. The light guide plate 40 may include mainly, for example, a transparent thermosetting resin such as a polycarbonate resin (PC) or an acrylic resin (for example, PMMA (polymethyl methacrylate)). The light guide plate 40 may have a shape of a cuboid including a pair of main surfaces (a front surface and a bottom surface) that face in the front-rear direction (the z direction) and four end surfaces (side surfaces) that are adjacent to them, that is, upper, lower, right, and left end surfaces.

The right and the left end surfaces of the light guide plate 40 serve as the light-incident surfaces 40A in which the light from the light source 10 enters, as mentioned above. It is to be noted that the light-incident surfaces 40A may be only one of the right and the left end surfaces of the light guide plate 40. Alternatively, the light-incident surfaces 40A may be three end surfaces, or all four end surfaces of the light guide plate 40.

The front surface of the light guide plate 40 may serve as the light-emission surface 40B that allows the light that has entered through the light-incident surface 40A to be emitted. The light-emission surface (the front surface) 40B and the bottom surface of the light guide plate 40 may have a planar shape corresponding to, for example, an object to be illuminated (for example, a liquid crystal panel 122, which will be described later) that is disposed on the light-emission surface 40B side of the light guide plate 40.

The bottom surface 40D of the light guide plate 40 may be provided with a printed pattern having irregular reflection characteristics (not illustrated in FIG. 11, refer to FIG. 13.) This pattern is configured to allow the light travelling toward the bottom surface 40D of the light guide plate 40 to be reflected toward the light-emission surface 40B of the light guide plate 40.

The reflection member 50 may be a plate-shaped or sheet-shaped member provided on the bottom surface 40D side of the light guide plate 40. The reflection member 50 is configured to allow the light leaking, from the light source 10, on the bottom surface 40D side of the light guide plate 40 or the light emitted, from inside of the light guide plate 40, on the bottom surface 40D side to return toward the light guide plate 40. The reflection member 50 may have functions of, for example, reflection, diffusion, scattering, or the like. This makes it possible to utilize the light from the light source 10 effectively, leading to enhanced front luminance.

The reflection member 50 may be configured of, for example, foamed PET (polyethylene terephthalate), a silver-evaporated film, a multilayer reflection film, or white PET. In a case that the reflection member 50 is provided with a function of regular reflection (mirror reflection), a surface of the reflection member 50 may be preferably surface-treated by silver evaporation, aluminum evaporation, multilayer film reflection, or the like. In a case that the reflection member 50 is provided with minute shapes, the reflection member 50 may be integrally formed by techniques such as heat press molding or melt extrusion molding using a thermosetting resin. Alternatively, the reflection member 50 may be formed by coating an energy-ray (for example, ultraviolet ray) curing resin onto a base made of, for example, PET or the like, and then transferring the shapes onto the energy-ray curing resin. Here, examples of thermosetting resins may include a polycarbonate resin, an acrylic resin such as PMMA (a polymethyl methacrylate resin), a polyester resin such as polyethylene terephthalate, an amorphous copolymer polyester resin such as MS (a copolymer of methyl methacrylate and styrene), a polystyrene resin, and a polyvinyl chloride resin. Moreover, in a case of transferring the shape onto an energy-ray (for example, ultraviolet ray) curing resin, the base may be glass.

The optical sheet 60 may be provided on the light-emission surface (the front surface) 40B side of the light guide plate 40, and may include, for example, a diffusion plate, a diffusion sheet, a lens film, a polarized light separation sheet, and so forth. FIG. 11 represents only one of these plural optical sheets 60. By providing the optical sheet 60 as mentioned above, it is possible to allow light emitted obliquely from the light guide plate 40 to rise in the front direction, leading to further enhanced front luminance.

FIG. 12 illustrates an arrangement relation of the light source 10, the luminescent body 20, the wavelength selective filter 30, and the light guide plate 40 illustrated in FIG. 11, representing a cross-section that includes a light-emission center 10A of the light source 10 and is vertical to the light-incident surface 40A.

The light source 10 may be disposed facing the light-incident surface 40A of the light guide plate 40. Between the light source 10 and the light-incident surface 40A, the container 22 accommodating the luminescent body 20 and the wavelength selective filter 30 may be disposed. The light source 10, the container 22, and the wavelength selective filter 30 may be held by, for example, a fixing member (a holder) 70. The reflection member 50 is laid on the bottom surface 40D side of the light guide plate 40.

The luminescent body disposed region 21 may preferably cross a region S1 surrounded by optical paths of light v31 and v32 that enters edges (an upper edge 40E and a lower edge 40F) of the light-incident surface 40A from the light source 10, and by the light-incident surface 40A. The luminescent body disposed region 21 may preferably extend to an outer region S2 beyond the region S1. By providing the luminescent body 20 in this way, it is possible to enhance color uniformity in a plane.

The container 22 and the accommodating section 23 may be configured similarly to those of the first embodiment.

The fixing member 70 may be configured of a high reflection polycarbonate resin, a polyamide-based resin (for example, "Genestar (trademark)" available from Kuraray Co. Ltd.), or the like. The fixing member 70 may include, for example, a first fixing section 71, a second fixing section 72, and a third fixing section 73. The first fixing section 71 holds the light source 10. The second fixing section 72 and the third fixing section 73 hold the container 22 of the luminescent body 20.

The first fixing section 71 may be a portion to which the light source substrates 12 on which the light source 10 is mounted are attached. The first fixing section 71 may face the light-incident surface 40A. A center portion of the first fixing section 71 may be provided with an opening 71C that penetrates the first fixing section 71 from an outer surface 71A to an inside surface 71B. On the outer surface 71A side of the opening 71C, a seat section 71D is provided by allowing a periphery of the opening 71C to be recessed in a tiered shape. Accordingly, the light source substrates 12 are fixed to the seat section 71D, allowing the package 11 with the light source 10 mounted thereon to fit loosely in the opening 71C. It is to be noted that the seat section 71D may be omitted depending on a size of the light source substrates 12. Moreover, part or all of the inside surface 71B may be preferably an inclined plane, in order to improve efficiency of utilizing light from the light source 10.

The second fixing section 72 and the third fixing section 73 are configured to hold an upper end and a lower end of the container 22 of the luminescent body 20 between them and to fix the container 22 in order to prevent displacement in position or orientation of the container 22. The second fixing section 72 and the third fixing section 73 may extend, for example, from an upper end and an lower end of the first fixing section 71 in a direction substantially perpendicular to the first fixing section 71. Accordingly, a cross-sectional shape of the first fixing section 71 to the third fixing section 73 may form, for example, three sides of a rectangle. The upper end and the lower end of the container 22 may be held by, for example, projections for fixing (not illustrated) provided on the second fixing section 72 and the third fixing section 73. It is to be noted that the upper end and the lower end of the container 22 may be fixed by other methods, for example, with a double-sided adhesive tape.

Further, between a tip portion of the second fixing section 72 and a tip portion of the third fixing section 73, an end of the light guide plate 40 and an end of the reflection member 50 may be interposed and held. It is to be noted that, between the second fixing section 72 and the third fixing section 73, at least the upper end and the lower end of the container 22 may be interposed. The end of the light guide plate 40 and the end of the reflection member 50 may be held by other members (which will be described later).

It is to be noted that, on an outer side of the fixing member 70 as described above, in particular in a periphery of the light source 10, an undepicted heat dissipation member (a heat spreader) may be attached. Further, the entirety of the illumination device 2 including the light source 10 to the fixing member 70 and the heat dissipation member (not illustrated) may be accommodated in an undepicted casing (not illustrated in FIGS. 11 and 12, refer to a rear casing 124 in FIG. 18, for example).

In the illumination device 3, as illustrated in FIG. 13, the light source 10 generates the light v11, v12, and v13 of the first wavelength. The light v11 to v13 passes through the wavelength selective filter 30 and enters the container 22. Here, the wavelength selective filter 30 is configured to transmit the light v11 to v13 of the first wavelength and to reflect the light v21 of the second wavelength. This allows the light v11 to v13 of the first wavelength generated from the light source 10 to transmit the wavelength selective filter 30 with little attenuation, to enter the container 22, and to travel toward the luminescent body 20.

The light v11 and v12 that enters the container 22 but does not collide with the luminescent body 20 passes through the container 22 and enters the light guide plate 40. Since the bottom surface 40D of the light guide plate 40 is provided with the pattern 41 having irregular reflection characteristics, the light v12 is reflected by the pattern 41, travels toward an upper portion of the light guide plate 40, and is emitted through the light-emission surface 40B. The light v11 is totally reflected by the light-emission surface 40B of the light guide plate 40 before reaching the pattern 41, travels toward the bottom surface 40D, is reflected by the pattern 41, and is emitted through the light emission surface 40B. The light thus emitted passes through the optical sheet 50 and is observed as light emission.

On the other hand, the light v13 that enters the container 22 and collides with the luminescent body 20 is wavelength-converted by the luminescent body 20, and becomes the light v21 and v22 of the second wavelength.

The light v21 that collides with the luminescent body 20 and is emitted forward A1F passes through the container 22, enters the light-incident surface 40A of the light guide plate 40, is reflected by the pattern 41, and is emitted through the light-emission surface 40B. The emitted light passes through the optical sheet 50 and is observed as light emission.

On the other hand, the light v22 also occurs that collides with the luminescent body 20 and is emitted rearward MR. Here, the wavelength selective filter 30 is configured to transmit the light v11 and v12 of the first wavelength and to reflect the light v21 and v22 of the second wavelength. This allows the light v22 to be reflected by the wavelength selective filter 30, is radiated forward A1F as the reflected light v23, passes through the container 22, and enters the light-incident surface 40A of the light guide plate 40. The light v23 is reflected by the pattern 41, and is emitted through the light-emission surface 40B. The emitted light passes through the optical sheet 50, is observed as light emission, and is utilized effectively.

Moreover, since the light source 10 is a point light source as mentioned above, the light generated from the light source 10 extends 360° omnidirectionally from the light-emission center 10A. As illustrated in FIG. 14, since the luminescent body disposed region 21 and the light-incident surface 40A are horizontally elongated, the horizontal extension of light is unlikely to be a problem in particular. On the other hand, there is a possibility that part of the light extending vertically is deviated above from the upper edge 40E or below from the lower edge 40F of the light-incident surface 40A.

Here, the luminescent body disposed region 21 crosses, as illustrated in FIG. 12, the region S1 surrounded by the optical paths of the light v31 and v32 that enters the edges (the upper edge 40E and the lower edge 40F) of the light-incident surface 40A from the light source 10, and by the light-incident surface 40A. In other words, the luminescent body disposed region 21 is across (crosses) the region S1 in a direction parallel to the light-incident surface 40A. Accordingly, it is possible to allow light that travels in the region S1 and enters the light-incident surface 40A to be wavelength-converted by the luminescent body 20.

Further, the luminescent body disposed region 21 extends to the outer region S2 beyond the region S1. In other words, the luminescent body disposed region 21 is provided to protrude from the region S1 and to overhang the outer region S2. Accordingly, it is possible to allow light that is emitted from the light source 10, extends vertically, and travels outside of the region S1 to be captured to some extent by the luminescent body 20 and to be wavelength-converted. Therefore, in the illumination device 2, less light, out of the light from the light source 10, fails to pass through the luminescent body disposed region 21, or fails to be wavelength-converted by the luminescent body 20. This leads to enhanced color uniformity in a plane.

As described above, in the present embodiment, similarly to the first embodiment, the wavelength selective filter 30 is provided on the light-incident side 20A of the luminescent body 20. The wavelength selective filter 30 is configured to transmit the light v11 and v12 of the first wavelength and to reflect the light v21 of the second wavelength. Hence, it is possible to improve efficiency of utilizing light.

Moreover, the luminescent body disposed region 21 crosses the region S1 surrounded by the optical paths of the light v1 and v2 that enters the edges (the upper edge 40E and the lower edge 40F) of the light-incident surface 40A from the light source 10, and by the light-incident surface 40A. The luminescent body disposed region 21 extends to the outer region S2 beyond the region S1. Hence, it is possible to reduce the light, out of the light from the light source 10, that fails to pass through the luminescent body disposed region 21, or fails to be wavelength-converted by the luminescent body 20, leading to enhanced color uniformity in a plane.

Modification Example 2

It is to be noted that, in the above-described second embodiment, description has been given on a case that the illumination device 3 includes, as its main part, the illumination device 1 according to the first embodiment. However, as illustrated in FIG. 15, it is possible to configure an illumination device 4 that includes, as its main part, the illumination device 2 according to the second embodiment and to allow the surface 22C that faces the light source 10 of the container 22 to be curved convexly toward the light source 10.

Fourth Embodiment

FIG. 16 illustrates an appearance of a display device 101 according to a fourth embodiment of the present embodiment. The display device 101 may be used as, for example, a thin television set, and may have a configuration in which a plate-shaped main body part 102 for image display is supported by a stand 103. It is to be noted that the display device 101 may be used as a stationary type placed on a horizontal plane such as a floor, a shelf, or a table in a state that the stand 103 is attached to the main body part 102. However, the display device 101 may be used as a wall-mounted type in a state that the stand 103 is removed from the main body part 102.

FIG. 17 illustrates, in an exploded manner, the main body part 102 illustrated in FIG. 16. The main body part 102 may include, for example, a front exterior member (a bezel) 111, a panel module 112, and a rear exterior member (a rear cover) 113 in this order from the front surface side (the observer side). The front exterior member 111 may be a frame-shaped member that covers a front periphery of the panel module 112, and may include a pair of speakers 114 disposed in its lower part. The panel module 112 may be fixed to the front exterior member 111. On its back surface, a power source substrate 115 and a signal substrate 116 may be mounted, and a bracket 117 may be fixed. The bracket 117 may be provided for fitting of a wall-mounting bracket, mounting of substrates or the like, and attachment of the stand 103. The rear exterior member 113 may cover the back surface and side surfaces of the panel module 112.

FIG. 18 illustrates, in an exploded manner, the panel module 112 illustrated in FIG. 16. The panel module 112 may include, for example, a front casing (a top chassis) 121, a liquid crystal panel 122, a frame member (a middle chassis) 80, the optical sheet 60, the light guide plate 40, the reflection member 50, a rear casing (the back chassis) 124, a balancer substrate 125, a balancer cover 126, and a timing controller substrate 127 in this order from the front surface side (the observer side).

The front casing 121 is a metal component that covers a front periphery of the liquid crystal panel 122. The liquid crystal panel 122 may include, for example, a liquid crystal cell 122A, a source substrate 122B, and a flexible substrate 122C such as a COF (Chip On Film) that connects these. The frame member 123 may be a frame-shaped resin component that holds the liquid crystal panel 122 and the optical sheet 50. The rear casing 124 may be a metal component made of iron (Fe) or the like that accommodates the liquid crystal panel 122, the intermediate casing 123, and the illumination device 3. The balancer substrate 125 is configured to control the illumination device 3, and may be mounted on a back surface of the rear casing 124 and covered by the balancer cover 126, as illustrated in FIG. 16. The timing controller substrate 127 may be also mounted on the back surface of the rear casing 124.

In the display device 101, light from the illumination device 3 is selectively transmitted by the liquid crystal panel 122, allowing image display to be performed. Here, as described in the third embodiment, the illumination device 3 with an enhanced efficiency of utilizing light is provided. This contributes to improvement in brightness of the display device 101 and reduction in power consumption.

It is to be noted that, in the above-described embodiment, description has been given on a case that the display device 101 includes the illumination device 3 according to the third embodiment. However, it goes without saying that the display device 101 may include the illumination device 4 according to the modification example 2 instead of the illumination device 3 according to the third embodiment.

Application Examples

In the following, description will be given on application examples of the display device 101 as described above to electronic apparatuses. Examples of electronic apparatuses may include a television set, a digital camera, a notebook personal computer, a mobile terminal device such as a mobile phone, a video camera, or the like. In other words, the display device as described above may be applied to an electronic apparatus in various fields that is configured to display an image or a picture based on a picture signal input from outside or generated inside.

Application Example 1

FIGS. 19 and 20 illustrate an appearance of an electronic book 210 to which the display device 101 according to the above-described example embodiment is applied. The electronic book 210 may include, for example, a display section 211 and a non-display section 212. The display section 211 is configured of the display device 101 according to the above-described example embodiment.

Application Example 2

FIGS. 21 and 22 illustrate an appearance of a smart phone 220 to which the display device 101 according to the above-described example embodiment is applied. The smart phone 220 may include, for example, a display section 221 and an operation section 222 on a front side, and a camera 223 on a back side. The display section 221 is configured of the display device 101 according to the above-described example embodiment.

Application Example 4

FIGS. 23 and 24 illustrate an appearance of a digital camera 240 to which the display device 101 according to the above-described example embodiment is applied. The digital camera 240 may include, for example, a lighting section for flash lighting 241, a display section 242, a menu switch 243, and a shutter button 244. The display section 242 is configured of the display device 101 according to the above-described example embodiment.

Application Example 5

FIG. 25 illustrates an appearance of a notebook personal computer 250 to which the display device 101 according to the above-described example embodiment is applied. The notebook personal computer 250 may include, for example, a main body 251, a keyboard 252 for input operations of characters and the like, and a display section 253 for image display. The display section 253 is configured of the display device 101 according to the above-described example embodiment.

Application Example 6

FIG. 26 illustrates an appearance of a video camera 260 to which the display device 101 according to the above-described example embodiment is applied. The video camera may include, for example, a main body 261, a lens 262 for photographing an object, which is provided on a front side face of the main body 261, a start/stop switch 263 in photographing, and a display section 264. The display section 264 is configured of the display device 101 according to the above-described example embodiment.

Application Example 7

FIGS. 27 and 28 illustrate an appearance of a mobile phone 270 to which the display device 101 according to the above-described example embodiment is applied. The mobile phone 270 may have a configuration, for example, in which an upper casing 271 and a lower casing 272 are linked by a connection section (a hinge section) 273, and may include a display 274, a sub-display 275, a picture light 276, and a camera 277. The display 274 or the sub-display 275 is configured of the display device 101 according to the above-described example embodiment.

Application Examples of Illumination Devices

FIGS. 29 and 30 illustrate an appearance of an illumination apparatus for desktop use, to which the illumination devices 1 to 4 according to the above-described example embodiments are applied. In the illumination apparatus 310, for example, an illumination section 313 may be attached to a support 312 provided on a base 311. The illumination section 313 is configured of one of the illumination devices 1 to 4 according to the above-described example embodiments. The illumination section 313 may be take any shape, for example, a tubular shape illustrated in FIG. 29 or a shape of a curved plane illustrated in FIG. 30, by allowing the light guide plate 40 to take a curved shape.

FIG. 31 illustrates an appearance of an illumination apparatus for indoor use, to which the illumination devices 1 to 4 according to the above-described example embodiments are applied. The illumination apparatus 320 may include, for example, an illumination section 321 that is configured of one of the illumination devices 1 to 4 according to the above-described example embodiments. The illumination section 321 may be disposed on a ceiling 322A of a building in appropriate number and at appropriate intervals. It is to be noted that the illumination section 321 may be placed at any locations depending on usages, for example, on a wall 322B or on a floor (not illustrated), without limitation to the ceiling 322A.

In the illumination apparatuses 310 and 320, illumination is carried out with the light from the illumination devices 1 to 4. Here, as described above in the example embodiments, the illumination devices 1 to 4 with enhanced efficiency of utilizing light are provided. This contributes to improvement in brightness and reduction in power consumption.

Although description has been made by giving the example embodiments, the contents of the present disclosure are not limited to the above-mentioned example embodiments and may be modified in a variety of ways. For example, a material and a thickness of each layer as described in the above-mentioned example embodiments are not limitative, but other materials and other thicknesses may be adopted.

Moreover, for example, in the above-described example embodiments, description has been made on a case that the light source 10 is an LED. However, the light source 10 may be configured of a semiconductor laser or the like.

Furthermore, for example, in the above-described example embodiment, description has been given on specific configurations of the illumination devices 1 to 4, and the display device 101 (a television set). However, it is not necessary to include all the components, and another component or other components may be further provided.

It is to be noted that the contents of the present technology may have the following configurations.

(1) An illumination device including:
a light source that is configured to generate light of a first wavelength;
a luminescent body that is configured to wavelength-convert the light of the first wavelength to light of a second wavelength, the second wavelength being different from the first wavelength; and
a wavelength selective filter that is provided on a light-incident side of the luminescent body, the wavelength selective filter being configured to transmit the light of the first wavelength and to reflect the light of the second wavelength.

(2) The illumination device according to (1),
wherein the luminescent body includes a fluorescent substance.

(3) The illumination device according to (2),
wherein the luminescent body includes a quantum dot.

(4) The illumination device according to (2),
wherein the luminescent body includes a sulfide phosphor.

(5) The illumination device according to any one of (1) to (4), including a container that accommodates the luminescent body,
wherein the wavelength selective filter is provided on an outer surface on a light-incident side of the container.

(6) The illumination device according to (5),
wherein the container includes, in an inside of the container, an accommodating section of the luminescent body, and
a width of the wavelength selective filter is larger than a width of the accommodating section.

(7) The illumination device according to (6),
the container has a shape of a cuboid and is disposed with a surface of the cuboid facing the light source, and
the wavelength selective filter is provided at least on a surface that faces the light source of the container.

(8) The illumination device according to (7),
wherein the surface that faces the light source of the container is curved convexly toward the light source.

(9) The illumination device according to (7) or (8),
wherein the wavelength selective filter extends, beyond the surface that faces the light source of the container, on at least part of a surface adjacent to the surface that faces the light source of the container.

(10) The illumination device according to any one of (1) to (9),
wherein the light source is a blue light source.

(11) The illumination device according to (10),
wherein the luminescent body is configured to wavelength-convert blue light to red light or green light.

(12) The illumination device according to any one of (1) to (11), including an optical member, the optical member including a light-incident surface that faces the luminescent body.

(13) The illumination device according to (12),
wherein the optical member is a light guide plate, and
the light-incident surface is an end surface of the light guide plate.

(14) A display device provided with a liquid crystal panel and an illumination device on a rear side of the liquid crystal panel,
the illumination device including:
a light source that is configured to generate light of a first wavelength;
a luminescent body that is configured to wavelength-convert the light of the first wavelength to light of a second wavelength, the second wavelength being different from the first wavelength; and
a wavelength selective filter that is provided on a light-incident side of the luminescent body, the wavelength selective filter being configured to transmit the light of the first wavelength and to reflect the light of the second wavelength.

It should be understood by those skilled in the art that various modifications, combinations, sub-combinations and alterations may occur depending on design requirements and other factors insofar as they are within the scope of the appended claims or the equivalents thereof.

The invention claimed is:

1. A display device comprising:
a front casing;
a rear casing;
a display panel supported by a middle chassis between the front casing and rear casing;
at least one light source on a light source substrate configured to emit light of a first wavelength range between the front casing and rear casing;
a luminescent body comprising quantum dot particles having an axis of 1 to 100 nanometers and being in a resin positioned to receive the light; and
an optical member supported by the middle chassis, the optical member having a light incident surface facing the luminescent body and a light emission surface having a planar shape that faces the display panel;
wherein the luminescent body is configured such that a portion of the light of the first wavelength range is converted to light of at least second wavelength range and is configured to transmits light of the first wavelength through the luminescent body without colliding with the wavelength conversion material to the light incident surface of the optical member.

2. The display device of claim 1 further comprising a wavelength selective filter provided outside the cured resin and being configured to transmit the light of the first wavelength range and to reflect the light of the second wavelength range and a third wavelength range.

3. A display device comprising:
a light source configured to emit blue light;

a luminescent body comprising quantum dot material having an axis of 1 to 100 nanometers provided in a cured resin and positioned to receive the blue light, and configured to convert some of the blue light into each of green light and red light;

a wavelength selective filter provided outside the cured resin and positioned on one side of the luminescent body, the wavelength selection filter position to receive the green light and the red light, and configured to transmit the blue light and to reflect the green light and the red light; and a display panel positioned on another side of the luminescent body, wherein the luminescent body is configured such that a portion of the blue light entering the luminescent body transmits through the luminescent body without colliding with luminescent material that comprises the quantum dot material.

4. The display device according to claim 3, wherein the luminescent body is in a container, and the container includes, in an inside of the container, an accommodating section of the quantum dot material in the cured resin, and a width of the wavelength selective filter is larger than a width of the accommodating section.

5. The display device according to claim 4, wherein the container has a shape of a cuboid, and is disposed with a surface of the cuboid facing the light source, and the wavelength selective filter is provided at least on a surface that faces the light source of the container.

6. The display device according to claim 5, wherein the surface that faces the light source of the container is curved convexly toward the light source.

7. The display device according to claim 5, wherein the wavelength selective filter extends, beyond the surface that faces the light source of the container, on at least part of a surface adjacent to the surface that faces the light source of the container.

8. The display device according to any one of claim 7, wherein the light guide plate has an end surface as a light-incident surface that faces the luminescent body.

9. The display device according to claim 8, wherein a disposed region in which the luminescent body is disposed crosses a region through which the light that travels from the light source to the end surface passes.

10. A display device comprising:
a light source configured to emit blue light;
a luminescent body comprising wavelength conversion material having particles having an axis of 1 to 100 nanometers provided in a cured resin and positioned to receive the blue light, and configured to convert some of the blue light into each of green light and red light; and
a display panel positioned on another side of the luminescent body,
wherein the luminescent body is configured such that a portion of the blue light entering the luminescent body transmits through the luminescent body without colliding with the wavelength conversion material.

11. The display device of claim 10 further comprising at least one light source substrate and comprises multiple light sources mounted on the light source substrate.

12. The display device of claim 10, wherein the wavelength conversion material is quantum dot material.

13. The display device of claim 10 further comprising:
a wavelength selective filter provided outside the cured resin and positioned on one side of the luminescent body, the wavelength selective filter positioned to receive the green light and the red light, and configured to transmit the blue light and to reflect the green light and the red light, wherein the wavelength conversion material is quantum dot material.

14. The display device of claim 13 further comprising:
a light guide plate positioned to receive the receive the green light, red light, and unconverted blue light; and
a reflection member on a side of the light guide plate.

15. The display device of claim 11 further comprising:
a wavelength selective filter provided outside the cured resin and positioned on one side of the luminescent body, the wavelength selective filter positioned to receive the green light and the red light, and configured to transmit the blue light and to reflect the green light and the red light.

16. The display device according to claim 15 comprising an optical member, wherein the wavelength selective filter is between the optical member and the luminescent body.

17. The display device according to claim 11, wherein the luminescent body is in a container, and
the container is configured such that a portion of the blue light entering the container transmits through the container without colliding with the luminescent body.

18. The display device according to claim 17, comprising a wavelength selective filter provided outside the luminescent body and positioned on one side of the luminescent body, the wavelength selection filter positioned to receive the green light and the red light, and configured to transmit the blue light and to reflect the green light and the red light.

19. The display device according to claim 18, wherein the wavelength selective filter is provided on an outer surface on a light-incident side of the container.

20. A display device comprising:
a light source configured to emit blue light;
a luminescent body comprising wavelength conversion material having particles having an axis of 1 to 100 nanometers provided in a cured resin and positioned to receive the blue light, and configured to convert some of the blue light into each of green light and red light;
a wavelength selective filter provided outside the cured resin and positioned on one side of the luminescent body, the wavelength selection filter positioned to receive the green light and the red light, and configured to transmit the blue light and to reflect the green light and the red light; and
a display panel positioned on another side of the luminescent body,
wherein the luminescent body is configured such that a portion of the blue light entering the luminescent body transmits through the luminescent body without colliding with luminescent material that comprises the wavelength conversion material.

* * * * *